US008408383B2

(12) United States Patent
Whittlesey

(10) Patent No.: US 8,408,383 B2
(45) Date of Patent: Apr. 2, 2013

(54) METHODS FOR MOUNTING OR REMOVING BELTS FROM TELESCOPING CONVEYOR MECHANISMS THAT COOPERATE WITH PACKAGING SYSTEMS HAVING CLIPPERS

(75) Inventor: Thomas E. Whittlesey, Apex, NC (US)

(73) Assignee: Tipper Tie, Inc., Apex, NC (US)

( * ) Notice: Subject to any disclaimer, the term of this patent is extended or adjusted under 35 U.S.C. 154(b) by 0 days.

(21) Appl. No.: 13/079,442

(22) Filed: Apr. 4, 2011

(65) Prior Publication Data

US 2011/0173791 A1 Jul. 21, 2011

Related U.S. Application Data

(62) Division of application No. 12/633,478, filed on Dec. 8, 2009, which is a division of application No. 11/851,721, filed on Sep. 7, 2007, now Pat. No. 7,650, 729.

(60) Provisional application No. 60/824,959, filed on Sep. 8, 2006.

(51) Int. Cl.
B65G 47/00 (2006.01)

(52) U.S. Cl. ........................................ 198/617; 198/812

(58) Field of Classification Search .................. 198/617, 198/812, 813
See application file for complete search history.

(56) References Cited

U.S. PATENT DOCUMENTS

| 2,720,055 | A | 10/1955 | Morris |
|---|---|---|---|
| 2,796,167 | A | 6/1957 | Thomson |
| 3,092,200 | A | 6/1963 | Chambers |
| 3,268,060 | A | 8/1966 | Long |
| 3,389,533 | A | 6/1968 | Tipper et al. |
| 3,499,259 | A | 3/1970 | Tipper et al. |
| 3,552,546 | A | 1/1971 | Rath |
| 3,587,204 | A | 6/1971 | George |
| 3,732,662 | A | 5/1973 | Paxton |
| 3,782,536 | A | 1/1974 | Toney |
| 3,945,171 | A | 3/1976 | Marietta, Jr. et al. |
| 4,008,028 | A | 2/1977 | Ronden et al. |
| 4,433,777 | A | 2/1984 | Densmore |
| 4,457,124 | A | 7/1984 | Hartmann |
| 4,537,006 | A | 8/1985 | Pieri |
| 4,683,700 | A | 8/1987 | Evans et al. |
| 4,766,713 | A | 8/1988 | Evans et al. |
| 5,085,036 | A | 2/1992 | Evans et al. |
| 5,161,347 | A | 11/1992 | May et al. |
| 5,203,760 | A | 4/1993 | Chen et al. |
| 5,205,779 | A | 4/1993 | O'Brien et al. |
| 5,314,375 | A | 5/1994 | O'Brien et al. |
| 5,334,084 | A | 8/1994 | O'Brien et al. |
| 5,351,809 | A | 10/1994 | Gilmore et al. |
| 5,495,701 | A | 3/1996 | Poteat et al. |
| 5,586,424 | A | 12/1996 | Chen et al. |
| 5,819,151 | A | 10/1998 | Naito et al. |
| 5,850,903 | A | 12/1998 | Walters |
| 5,947,263 | A | 9/1999 | Uber et al. |
| 5,984,083 | A | 11/1999 | Hosch et al. |
| 6,067,773 | A | 5/2000 | Le |
| 6,161,683 | A | 12/2000 | Wallis |
| 6,273,241 | B1 | 8/2001 | Bonnet |

(Continued)

Primary Examiner — Joseph A Dillon, Jr.
(74) Attorney, Agent, or Firm — Myers Bigel Sibley & Sajovec, P.A.

(57) ABSTRACT

Methods of mounting a conveyor belt to a telescoping conveyor include: (a) providing a conveyor belt configured to mount to a telescoping conveyor mechanism; (b) pivoting a first idler roller to an operative fixed position; and (c) translating an idler residing below the first idler roller upward and rearward into its respective operative fixed position to thereby mount a telescoping conveyor belt.

8 Claims, 30 Drawing Sheets

U.S. PATENT DOCUMENTS

| | | |
|---|---|---|
| 6,374,991 B1 | 4/2002 | Swinderman |
| 6,478,161 B2 | 11/2002 | Howell |
| 6,575,292 B2 | 6/2003 | Swinderman |
| 6,622,602 B2 | 9/2003 | Rompa |
| 6,679,033 B2 | 1/2004 | Hart et al. |
| 6,695,124 B2 | 2/2004 | Nixon |
| 6,763,750 B2 | 7/2004 | Lindee |
| 6,766,721 B2 | 7/2004 | Dharia |
| 6,932,688 B2 | 8/2005 | Stanley et al. |
| 6,935,489 B2 | 8/2005 | Kawasaki |
| 6,986,418 B2 | 1/2006 | Swinderman et al. |
| 7,131,532 B2 | 11/2006 | Webster et al. |
| 7,322,163 B2 | 1/2008 | Griggs et al. |
| 7,383,944 B2 | 6/2008 | Hall et al. |
| 7,386,966 B2 | 6/2008 | Griggs et al. |
| 7,650,729 B2 | 1/2010 | Whittlesey |
| 2002/0029998 A1 | 3/2002 | Howell |
| 2002/0070096 A1 | 6/2002 | Swinderman |
| 2004/0016625 A1 | 1/2004 | Nixon |
| 2004/0079621 A1 | 4/2004 | Mott |
| 2004/0206054 A1 | 10/2004 | Welborn et al. |
| 2005/0189202 A1 | 9/2005 | Kawasaki |
| 2005/0229541 A1 | 10/2005 | Griggs et al. |
| 2005/0235608 A1 | 10/2005 | Griggs et al. |
| 2005/0247026 A1 | 11/2005 | Griggs et al. |
| 2006/0011452 A1 | 1/2006 | Swinderman et al. |
| 2006/0045684 A1 | 3/2006 | Sperling |
| 2010/0072037 A1 | 3/2010 | Jabber et al. |

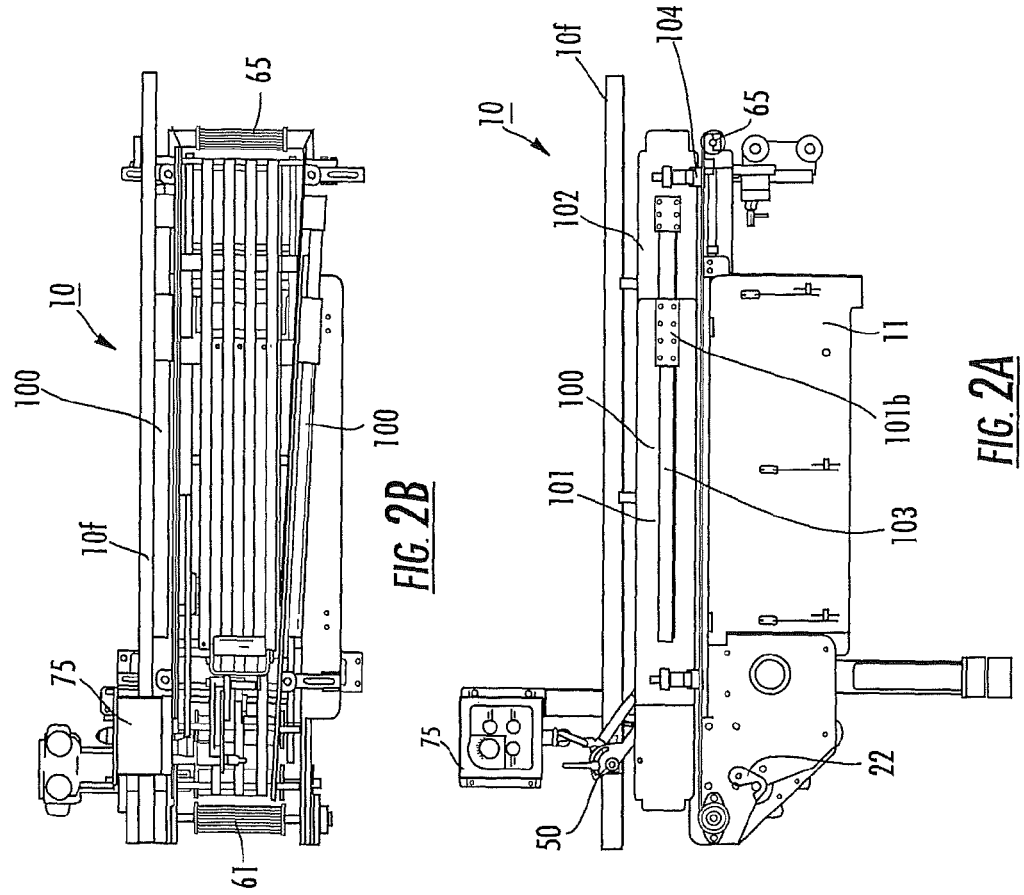

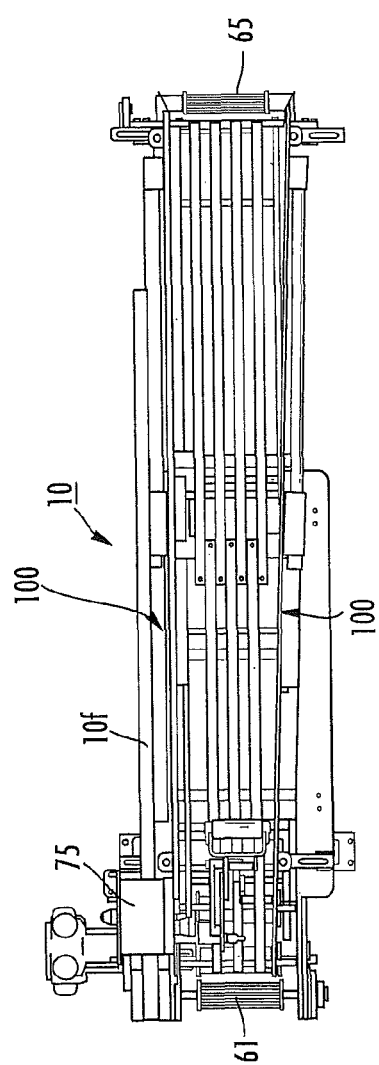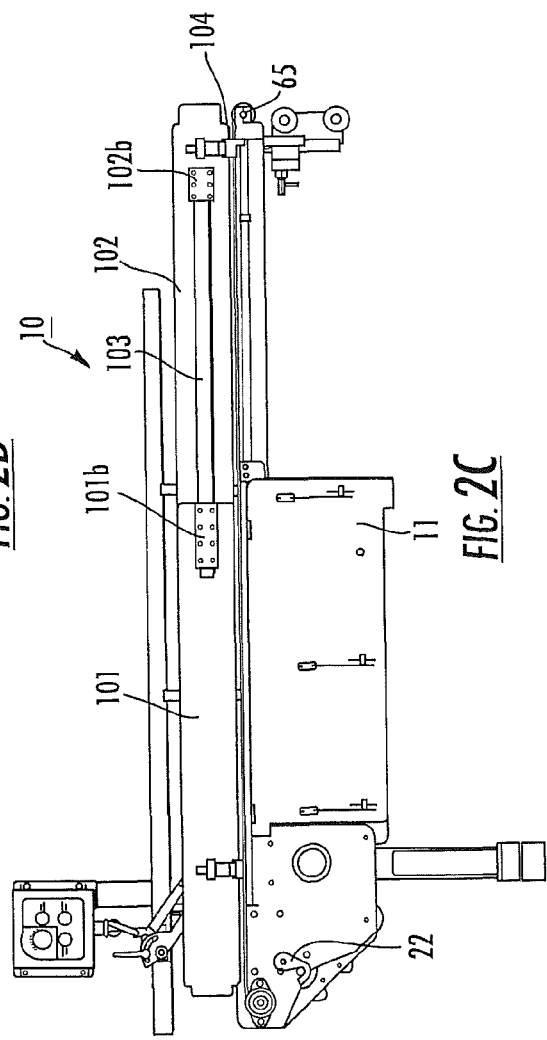

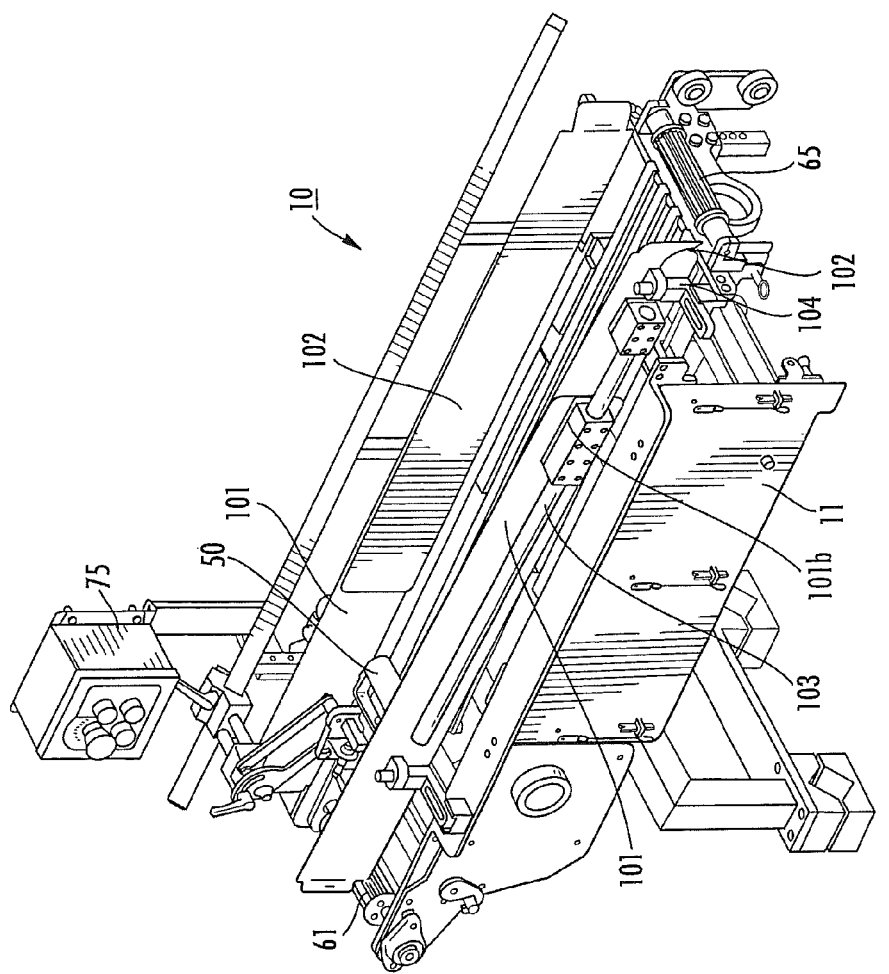

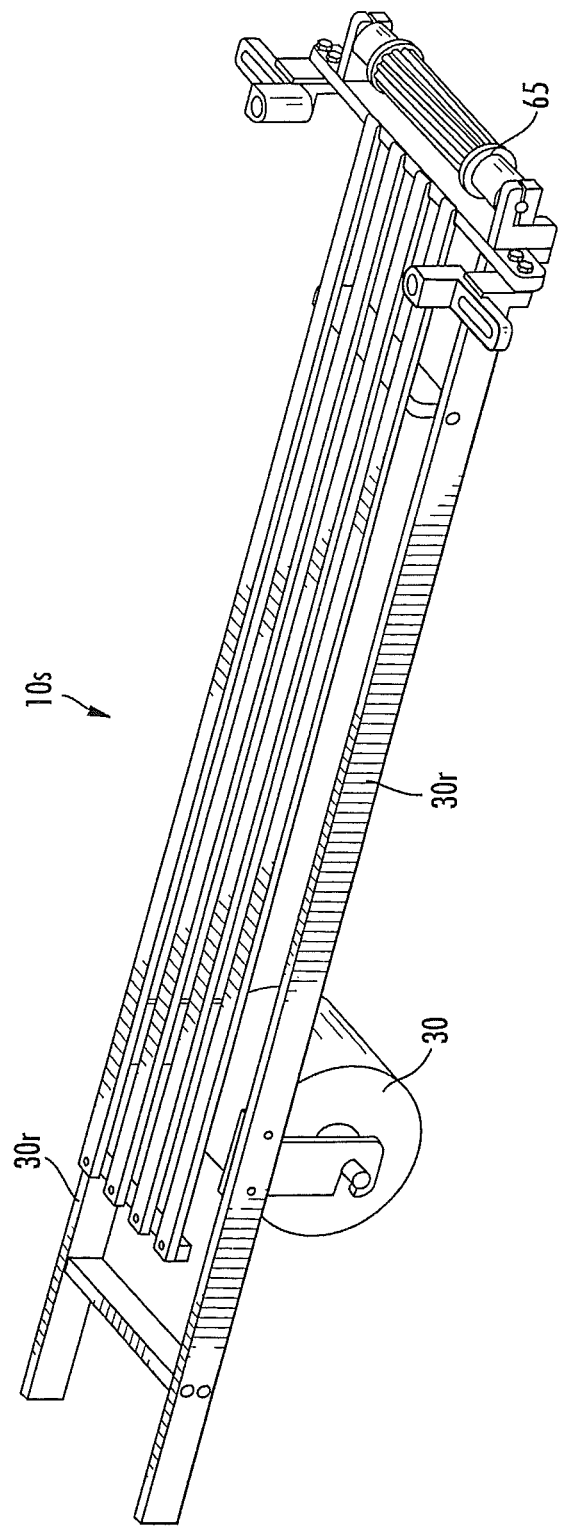

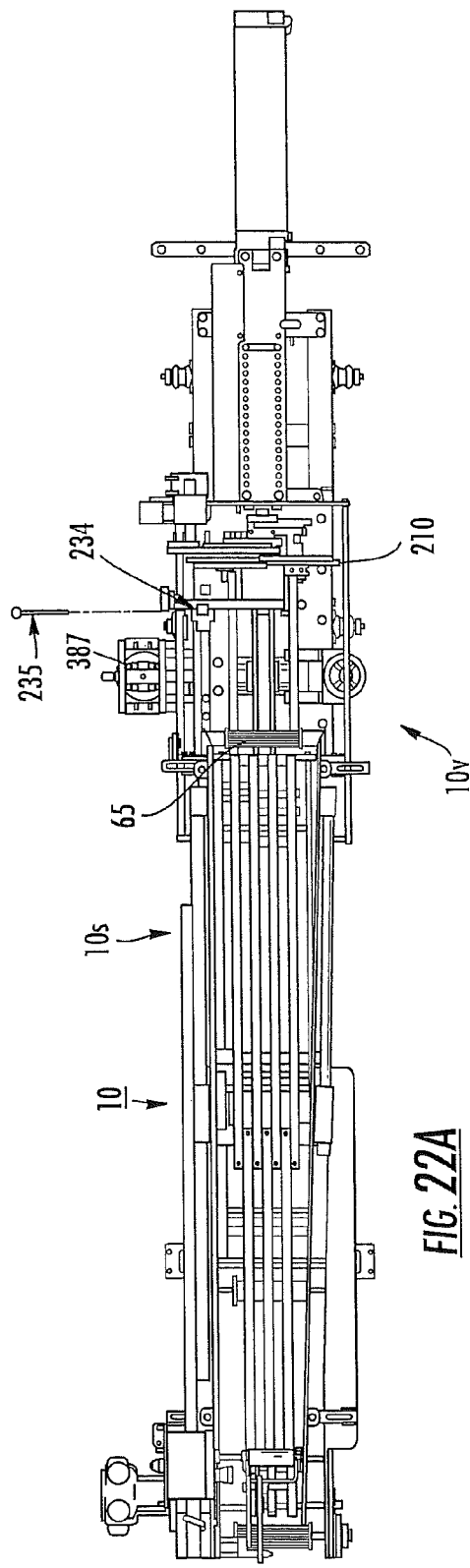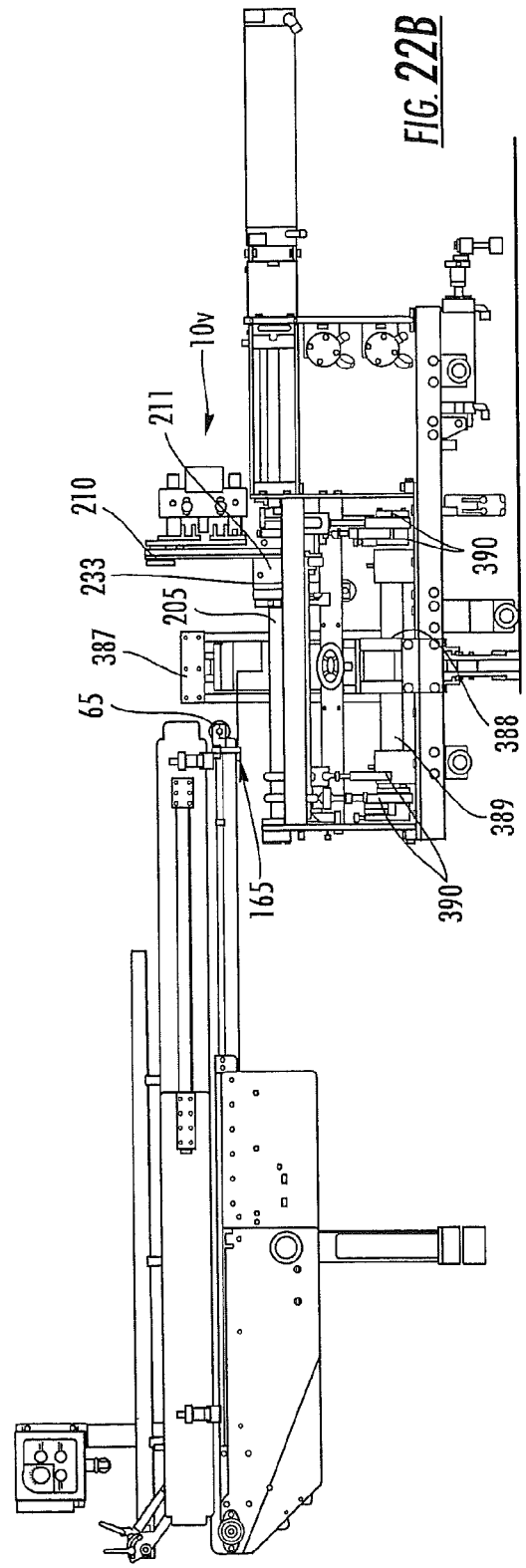
FIG. 22A
FIG. 22B

METHODS FOR MOUNTING OR REMOVING BELTS FROM TELESCOPING CONVEYOR MECHANISMS THAT COOPERATE WITH PACKAGING SYSTEMS HAVING CLIPPERS

RELATED APPLICATIONS

This application is a divisional of U.S. patent application Ser. No. 12/633,478, filed Dec. 8, 2009, which is a divisional of U.S. patent application Ser. No. 11/851,721, filed Sep. 7, 2007 now U.S. Pat. No. 7,650,729, which claims priority to U.S. Provisional Application Ser. No. 60/824,959, filed Sep. 8, 2006, the contents of which are hereby incorporated by reference as if recited in full herein.

FIELD OF THE INVENTION

The present invention relates to apparatus, systems, methods and computer program products that apply clips to packages.

BACKGROUND OF THE INVENTION

Conventionally, in the production of consumer goods such as, for example, meat or other food products, the food is fed (typically pumped) or stuffed into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming a thin sheet of flexible material, typically elastomeric material, together. U.S. Pat. Nos. 5,085,036 and 5,203,760 describe examples of automated substantially continuous-feed devices suitable for forming sheet material or flat roll stock into tubular film casings. The contents of these patents are hereby incorporated by reference as if recited in full herein.

It is known to use edible collagen film to cover semi-solid sections of meat during processing to form a smoked meat product that gives the appearance of a solid meat muscle, such as a boneless ham. One example of a known prior art apparatus used to form a smoked meat product is the "TCM2250" pumpable model from Tipper Tie, Inc., located in Apex, N.C.

Clip attachment apparatus or "clippers" are well known to those of skill in the art and include those available from Tipper Tie, Inc., of Apex, N.C., including product numbers Z3214, Z3202, and Z3200. Examples of clip attachment apparatus and/or packaging apparatus are described in U.S. Pat. Nos. 3,389,533; 3,499,259; 4,683,700; and 5,161,347, the contents of which are hereby incorporated by reference as if recited in full herein.

A double clipper can concurrently apply two clips to the tails and leading portions of casings or "chubs". One clip defines the first end portion of the next package or chub and the other defines the trailing or second end portion of the package or chub then being closed. A cutting mechanism, typically incorporated in the clipper, can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

In the past, telescoping (axially extending and retracting) conveyors, such as that proposed by U.S. Pat. No. 6,932,688, have been used to hold (clipped) packages of pumped product discharged from a stuffing horn to support the packages and transfer them downstream of the clipper. The contents of this patent are hereby incorporated by reference as if recited in full herein. Nonetheless, there remains a need for alternate axially telescoping conveyor designs.

SUMMARY OF EMBODIMENTS OF THE INVENTION

Embodiments of the present invention provide, axially telescoping "take away" conveyor systems with a stationary discharge end portion and related, apparatus, systems, methods and computer program products. The telescoping conveyors may operate with pivoting or non-pivoting clippers, such as, for example, stationary-mount clippers and can allow for adjustable (flexibility in size) stuffed package sizes.

The axially extending conveyors may be configured with a relatively easily removable and/or belt loading for ease of cleaning (washdown). The axially extending conveyors can include detachable axially extending and retracting sidewalls that reside above the conveying surface of the belt.

Spaced apart external vertical (stationary) housing sidewalls reside below the conveying surface of the belt and hold a mounting arm that supports an idler roller or idler. One of the external housing sidewalls can include a quick connect locking member that can be releasably attachable to the system mounting frame to allow access to an interior portion of the conveyor mechanism.

Some embodiments are directed to packaging systems that include: (a) a clipper; (b) a conveyor mechanism in communication with the clipper, the conveyor mechanism comprising an axially telescoping conveyor with a belt defining a conveying surface having a conveying length configured to reciprocally axially extend and retract; and (c) at least one pair of upwardly extending product guide sidewalls residing at least partially above the conveying surface of the conveyor belt, the pair of product guide sidewalls slidably attached to each other to axially translate substantially in concert with the axially telescoping conveyor between an extended and retracted position.

Some embodiments are directed to packaging systems that include: (a) a mounting frame holding a telescoping conveyor with a belt; (b) a first idler roller in communication with the belt; (c) an idler in communication with the belt residing upstream of and lower than the first idler roller; and (d) a substantially horizontal axially extending slot in a mounting bracket attached to the mounting frame, the slot and idler cooperate to allow for adjustment of tension in the conveyor belt.

Some embodiments are directed to telescoping conveyor systems configured to cooperate with an automated or semi-automated clipper. The systems include: (a) an axially telescoping conveyor with a belt defining a conveying surface having a conveying length configured to reciprocally axially extend and retract; and (b) a first idler roller and an idler, each in communication with the belt, and wherein each of the idler roller and the idler is configured to pivot or translate from an operative position to a belt removal and reload position.

In particular embodiments, the system can include a frame holding the conveyor, the frame can have a slot sized and configured to slidably receive and hold the first idler roller.

Some embodiments are directed to methods of removing a belt from a telescoping conveyor. The methods include: (a) pivoting an idler roller associated with a telescoping conveyor from an operative position to a belt removal and/or belt load configuration to thereby allow a conveyor belt to at least partially collapse from an operative configuration; and (b) removing the conveyor belt from the telescoping conveyor after the pivoting step.

In particular embodiments, the methods may also or alternatively include translating an idler residing below and upstream (toward the clipper) of an idler roller downward before removing the belt and/or lifting off at least one pair of releasably detachable cooperating product guide sidewalls from the telescoping conveyor before the removing step.

Other embodiments are directed to methods of mounting a conveyor belt to a telescoping conveyor. The methods include: (a) providing a conveyor belt configured to mount to a telescoping conveyor mechanism; (b) pivoting a first idler roller to an operative fixed position; and (c) translating an idler residing rearward of the first idler upward and rearward into its respective operative fixed position thereby mounting a telescoping conveyor belt.

In particular embodiments, the methods may also include placing a mounting arm holding the idler through an aperture in a vertically extending housing sidewall and inserting a locking member into the mounting arm to lock the idler to the sidewall after the belt is mounted to the conveyor. The translating step may be carried out by pivoting the idler rearward and upward to extend laterally (substantially perpendicular to the axial direction) in a substantially horizontal orientation, and the method may include sliding the idler roller axially in a slot to adjust the tension in the belt after the pivoting step.

In some embodiments the packaging machine can include a control module with a computer program product. The computer program product includes a computer readable storage medium having computer readable program code embodied in the medium. The computer-readable program code is configured to automatically direct the extension and retraction of the conveyor, and components associated with an automated or semi-automated clipper, such as, for example, the movement of the voider(s) and actuation of first and second actuators to substantially synchronize the movement of the first and gate members, so that the open configuration is timed to coincide with the release of target articles and the closed configuration is timed to coincide with the capture of target articles to define the closed gate clip path for the clipper.

These and other objects and/or aspects of the present invention are explained in detail in the specification set forth below.

BRIEF DESCRIPTION OF THE DRAWINGS

FIG. 2A is a side view of the device shown in FIG. 1A with side rails according to some embodiments of the present invention.

FIG. 2B is a top view of the device shown in FIG. 2A.

FIG. 2C is a side view of the device shown in FIG. 2A but illustrating the conveyor and sidewalls in the extended configuration according to embodiments of the present invention.

FIG. 2D is a top view of the device shown in FIG. 2C.

FIG. 2E is a side perspective view of the device shown in FIG. 2A.

FIG. 6A is a side perspective view of a subassembly of a sliding portion of a telescoping conveyor according to embodiments of the present invention.

FIG. 22A is a top view of the telescoping conveyor according to embodiments of the present invention.

FIG. 22B is a side view of the device shown in FIG. 22A according to embodiments of the present invention.

DETAILED DESCRIPTION

Figure 1A:
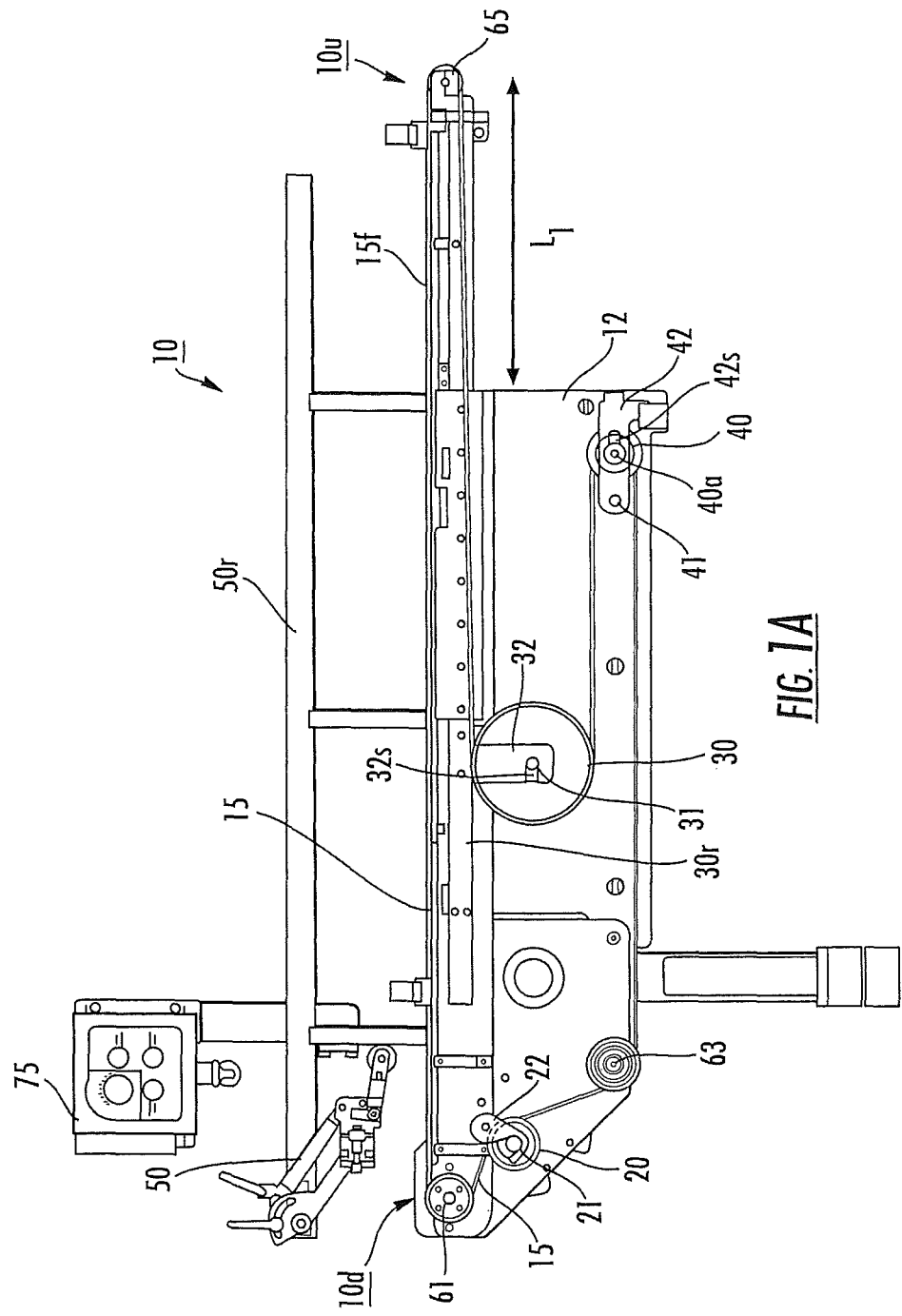
FIG. 1A is a side view of a telescoping conveyor (with housing sidewalls omitted for clarity) according to embodiments of the present invention showing a retracted configuration of the conveyor.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. The description of a feature with respect to one embodiment can be included in another embodiment, unless described otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the application and should not be interpreted in an idealized or overly formal sense unless expressly so defined herein.

In the description of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The term "conveyor belt" means any substrate or floor type including one or more of metal, polymer, fabric or other food compatible material. The belt may have a closed (continuous) or open (foraminated) conveying surface. Typically the belt is configured to provide a multi-use (over at least one production week) washable floor suitable for food production purposes (and may be FDA approved). One example of a suitable conveyor belt is a belt comprising urethane T10 with Kevlar cords, which may have a scuffed surface, identified as a timing belt available from Gates Mectrol, having a place of business in Salem, N.H., under part number 150T10/4370KFDA. The belt may be about 150 mm wide and about 4370 mm long.

The term "frame" means a generally skeletal structure used to support one or more assemblies, modules and/or components. The frame can be a floor mount frame. The term "automated" means that operations can be carried out substantially without manual assistance. The term semi-automatic means that operator input or assistance may be used, but that most operations are carried out automatically using electromechanical devices, pneumatic actuators, and programmatically directed operation and control systems.

The terms "idler" and "idler roller" are used interchangeably herein, and where different members are called idler rather than idler roller, this is for ease of discussion rather than to indicate different functional operation, as the idler and idler rollers can each roll and each communicates with the conveyor belt.

Figure 1B:
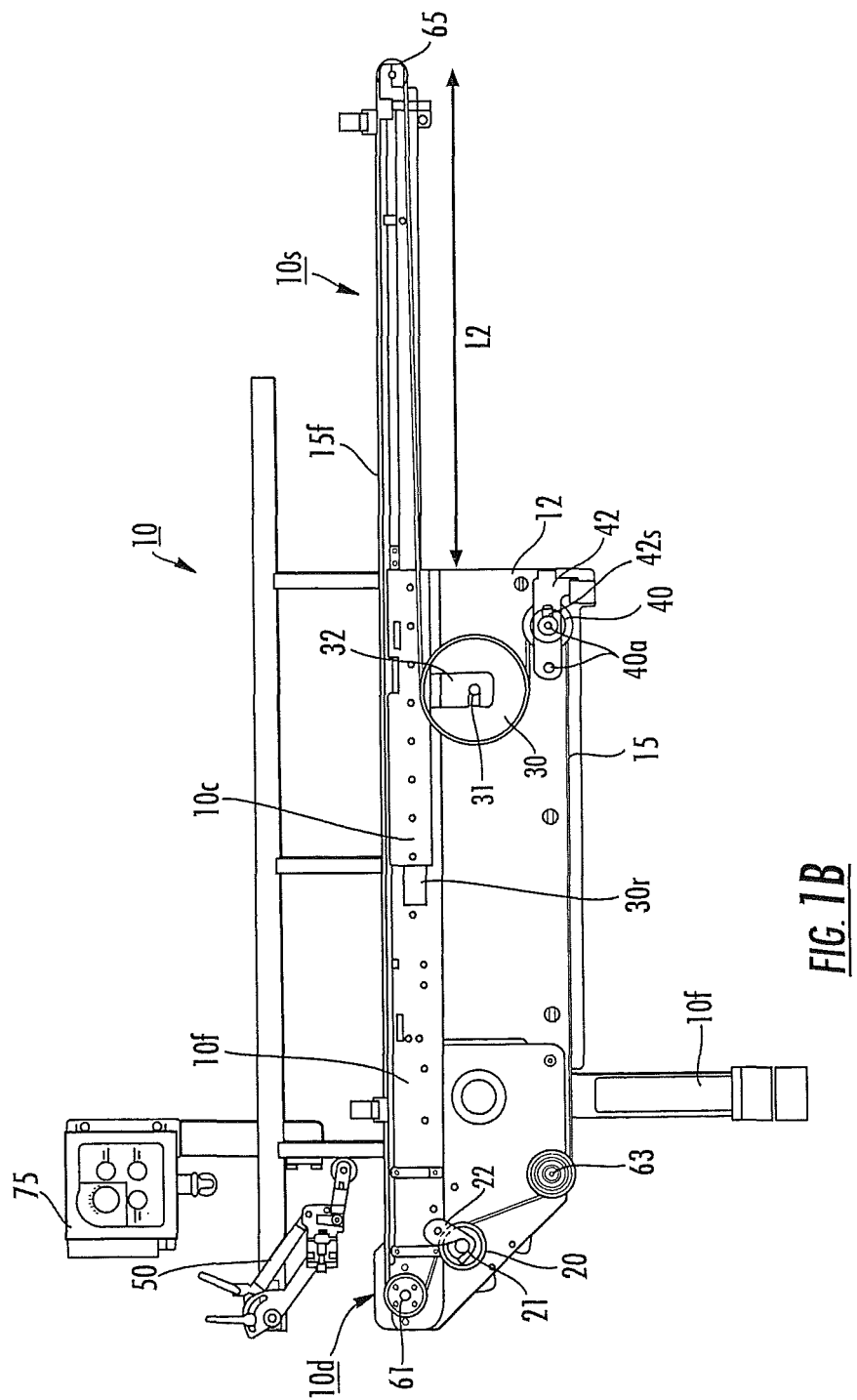
FIG. 1B is a side view of the device shown in FIG. 1A illustrating the conveyor in an extended configuration according to embodiments of the present invention.

FIGS. 1A and 1B illustrate a telescoping conveyor system 10 that provides a belt 15 with a conveying floor 15f that has an axially extending and retracting length, shown as length "$L_1$" (the shorter length) in FIG. 1A and length "$L_2$" (a longer length) in FIG. 1B. As shown, the downstream most end portion 10d can be stationary, with the upstream portion 10u being configured to axially reciprocally translates to provide the telescoping axial length. The distance the conveyor telescopes can vary, such as, for example, between about 10-30 inches, and in some embodiments, may axially extend and retract about 21 inches.

As shown in FIGS. 1A and 1B, the system 10 can include a first idler roller 20, a second idler roller 63, a third idler roller 30 and an idler 40 that cooperate to hold the belt 15 in a desired tension. The first idler roller 20 and the idler 40 can be stationary during the telescoping movement of the belt 15. The system 10 can also include a forward drive wheel 61, and rearward idler roller 65 (also known as a nose roller).

Figure 1C:
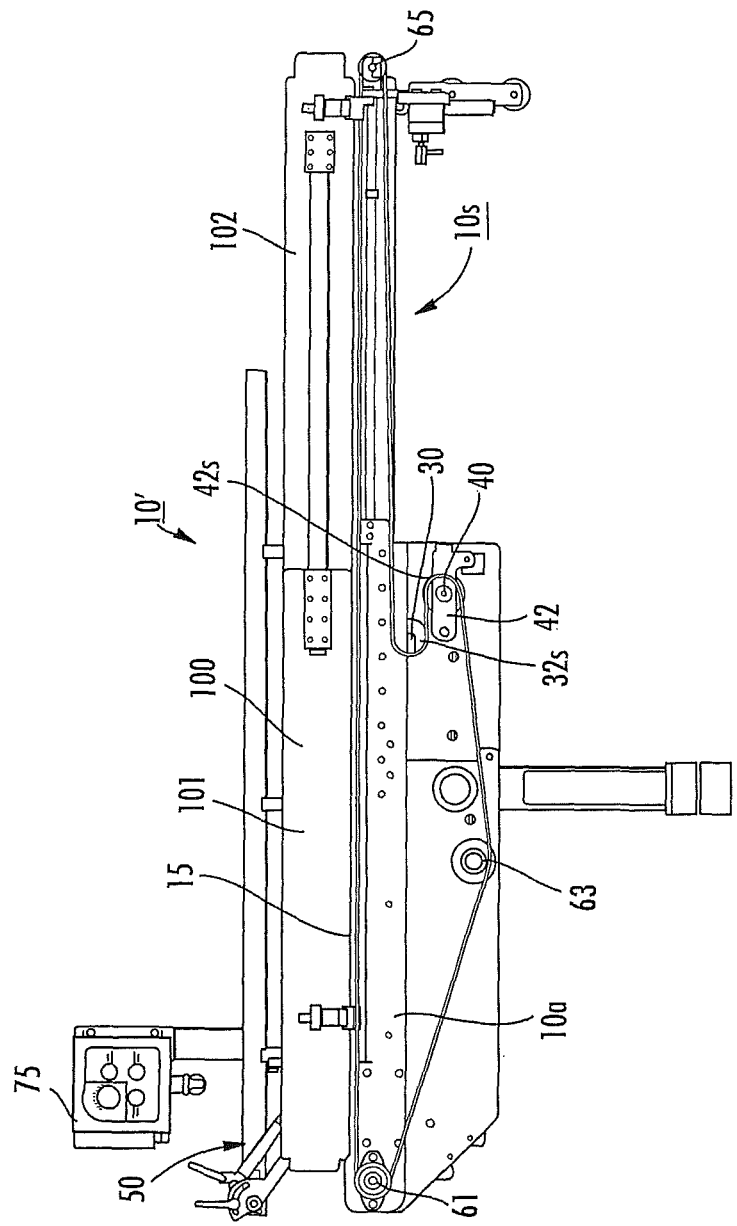
FIG. 1C is a side view of a telescoping conveyor (with housing sidewalls omitted for clarity) according to embodiments of the present invention.
Figure 1D:
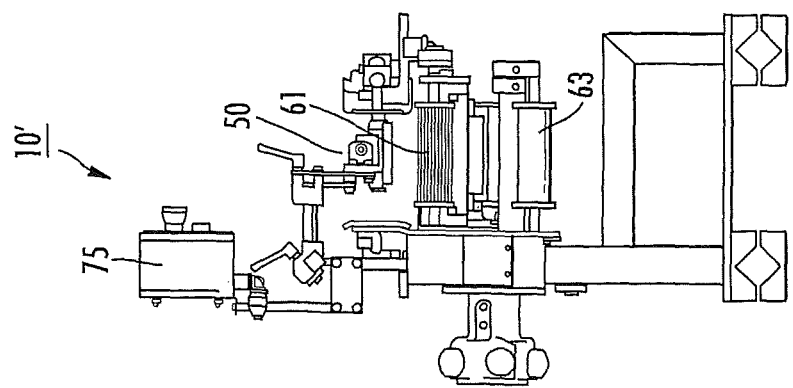
FIG. 1D is an end view of the device shown in FIG. 1C.

FIGS. 1C and 1D illustrate an alternate conveyor system 10'. In this embodiment front idler roller 20 is omitted and, as shown, the idler roller 63 can be positioned below idler 40. Idler rollers 30, 65 can translate and/or slide with extension and retraction of the conveyor surface 15f. That is, idler rollers 30, 65 can mount to the sliding mechanism of the conveyor 10, 10' and translate in concert with the conveyor floor 15l. Drive wheel 61 and idler rollers 40, 63 do not typically axially extend and can be mounted to be affixed in place during operation (as is front roller idler 20, where used). In particular embodiments, members 30, 40 and 63 can have about the same outer diameter, such as, for example, about a 2-inch outer diameter, while idler roller 65 may have a smaller diameter, such as about 39.5 mm, and drive wheel 61 may have a bout a 55.45 mm diameter. The drive wheel 61, idler rollers 63, 30, 65 and idler 40 cooperate with the belt to provide the desired belt adjustability, tension, and/or configuration. The idler 40 cooperates with the belt 15 and the idler rollers 63, 65, 30 (and optionally, 20) to take-up or release the conveyor belt 15 to maintain a desired tension, whether the belt 15 is in the extended or retracted conveyor surface length 15f.

As shown, the idler roller 30 and 65 can reciprocally move forward and rearward (substantially horizontally) in response to actuation of a shaft in communication with an actuation rod to thereby adjust the floor length 15f. The idler rollers 30 and 65 can mount to the sliding assembly 10s (see also FIG. 6A) and slidably advance and retract with the conveyor floor 15f. As shown in FIGS. 1A, 1B the device has rails 30r that snugly reside in and slide through substantially rigid elastomeric (such as a rigid polymeric, plastic or hard nylon) guides or bushings 10c attached to the frame 10f. The embodiment shown in FIGS. 1C and 1D do not illustrate the rails 30r and bushings 10c as they reside inside an angle bracket 10a associated with the housing/frame and, as such, are not shown in these views.

FIG. 6A illustrates one embodiment of a receiving or front-end sliding subassembly 10s that defines the rails 30r that slide with respect to the frame 10f to axially extend and retract the floor 15f. The sliding subassembly 10s can attach to a static rear (discharge end) subassembly to define the axially extendable/retractable conveyor floor, so that the discharge end portion of the conveyor does not axially translate.

Figure 6B:
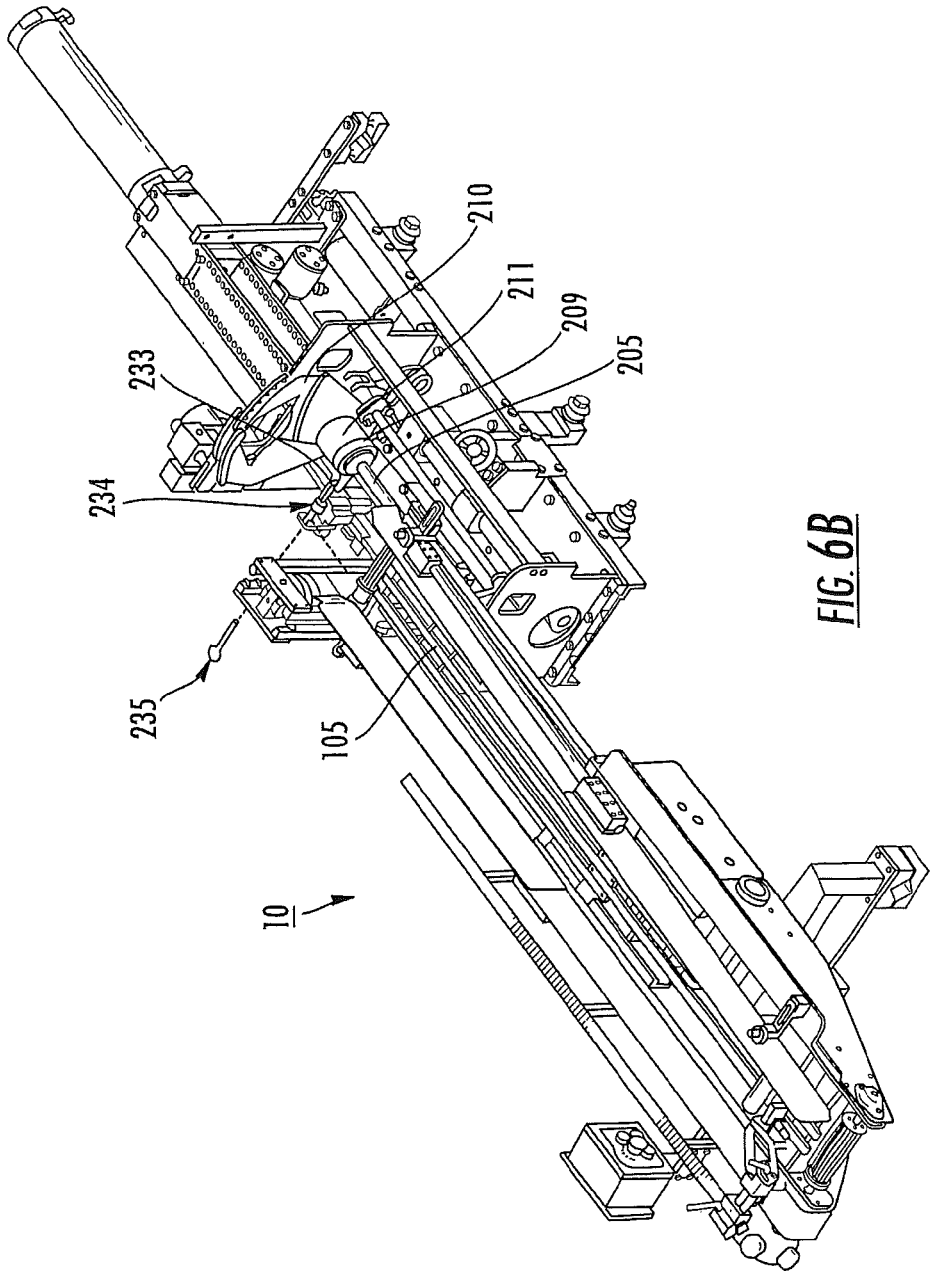
FIG. 6B is a side perspective view of a system with the telescoping in a partially exploded view to illustrate an attachment of the subassembly shown in FIG. 6A to the translating shaft according to embodiments of the present invention.

FIG. 6B illustrates a telescoping conveyor/voider assembly 10v with the subassembly 10s attached to the translation drive of the packaging system. In this embodiment, a side-mounting arm 233 is attached to a collar 209 affixed to a hub 211 that is in communication with an axially reciprocally translating shaft 205. The hub 211 can also be attached to the forward voider 210. The mounting arm 233 can extend laterally outward to a conveyor height adjustor 234. The shaft 205 is in communication with the actuation rod and actuator (resides upstream of the clipper, not shown) to drive the axial extension and retraction of the conveyor (and forward voider 210). A detent pin 235 can be used to attach the conveyor 10 to the height adjuster 234. FIGS. 22A and 22B illustrate that a receiving bore 165 can reside under and proximate the nose roller or idler roller 65. The bore 165 is aligned with a bore in the conveyor height adjuster 234 and the detent pin 235 can extend through both bores.

As shown in FIGS. 2A, 2C and 2E, the system 10 can include first and second housing sidewalls 11, 12 (the sidewall 12 is shown FIG. 1A) that mount to the system frame 10f and hold the idler rollers 20 (where used), 30 and idler 40.

Figure 5:
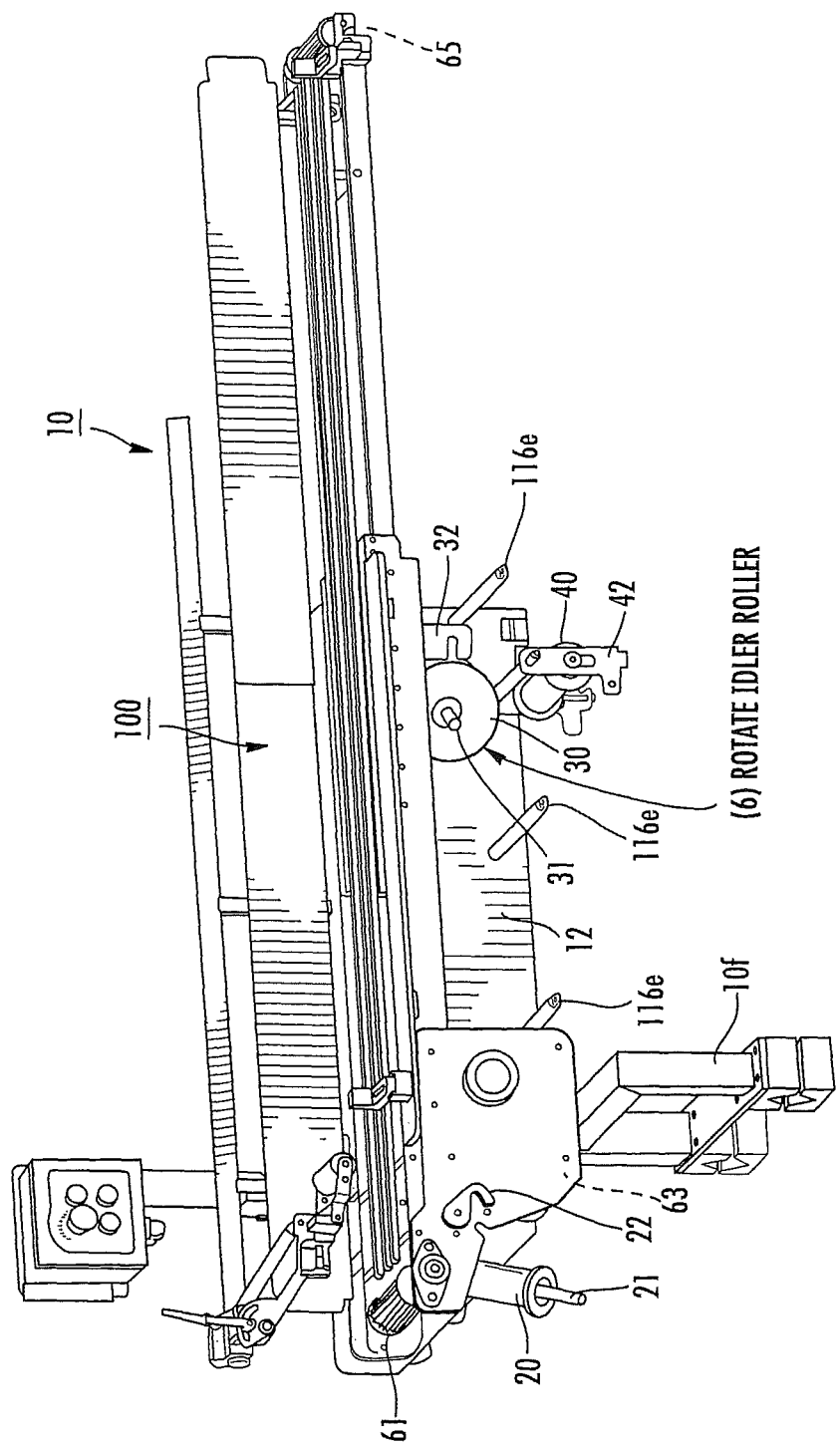
FIG. 5 is a side perspective view of the device shown in FIG. 4, illustrating one set of product guides and one housing wall and the belt removed with certain features disengaged to allow belt removal/loading according to embodiments of the present invention.

The idler roller 30 and the idler 40 can pivot and/or rotate while remaining attached to one of the housing walls 12 to allow for ease of removal and/or loading of the belt 15 as shown, for example, in FIG. 5. As shown in FIGS. 1A-1D, the idler roller 30 can have a mounting arm with an end portion 31 that is releasably held by a respective mounting member 32 to the system frame 10f. The mounting member 32 can include an open slot 32s that allows the idler roller 30 to slide forward and out of the mounting member 32 to thereby pivot (typically downward and/or forward). The mounting member 32 can mount to rails 30r. For both the embodiments shown in FIGS. 1A and 1C, when slid out of the slot 32s, the idler roller 30 can pivot forward.

Similarly, for the embodiment shown in FIGS. 1A and 1B, the idler roller 20 (where used) can include a mounting arm with an end portion 21 that is releasably held by mounting member 22. As shown, the mounting member 22 can itself pivot forward and rearward to hold or release the end 21 of the first idler roller 20. Thus, one or both members 20, 30 can be mounted so as to pivot and/or rotate when released from the mounting member 22, 32.

Figure 14:
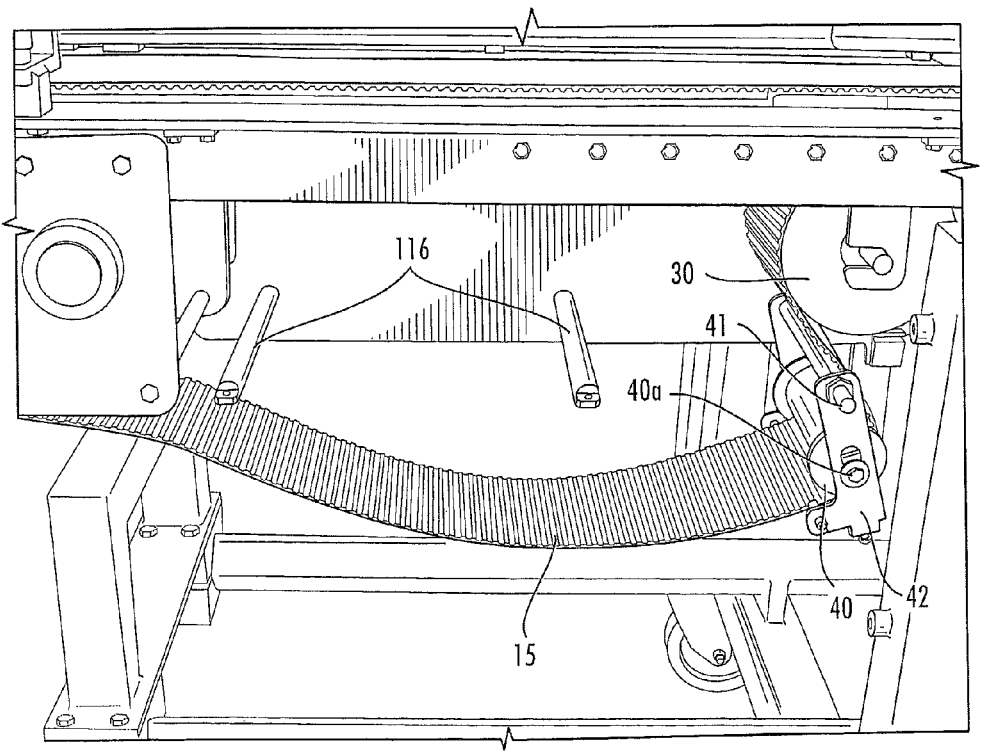
FIG. 14 is a side view of the device shown in FIG. 13 after the idler roller is in position and before the adjustable idler is lifted into operative position according to embodiments of the present invention.
Figure 15:
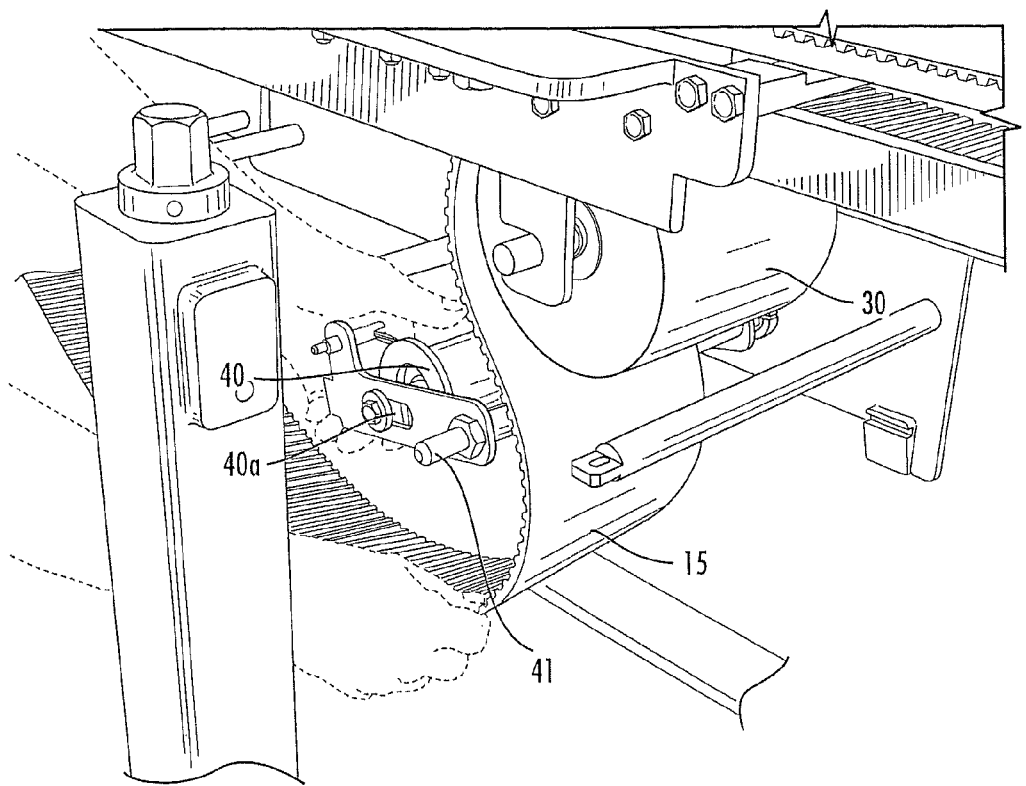
FIGS. 15-17 are views of the device shown in FIG. 10 illustrating a sequence of operations that can be used to orient the belt and adjustable idler into operative position according to embodiments of the present invention.

As will be explained further with respect to FIGS. 16, 17, and 21, the idler 40 can be held by a shaft mounting arm 40a attached to a bracket 42. The bracket 42 can be attached to the frame 10f with a laterally extending arm 41 that pivots (as shown for example in FIG. 14). At an axially spaced apart location, the bracket 42 can also be attached to the wall 12 of the frame 10f such as with pin 43. When one side of member 41 is detached from the frame wall 11 and pin 43 is pulled from wall 12, one side of the subassembly is released while still holding the idler 40 allowing the idler 40 to translate relative to the operative configuration. The idler 40 and shaft 40a translation can be configured so as to rotate and/or pivot downward and/or forward relative to the other laterally opposing end portion 41b of the arm 41 that remains attached to the frame 10f and/or wall 12.

Figure 21:
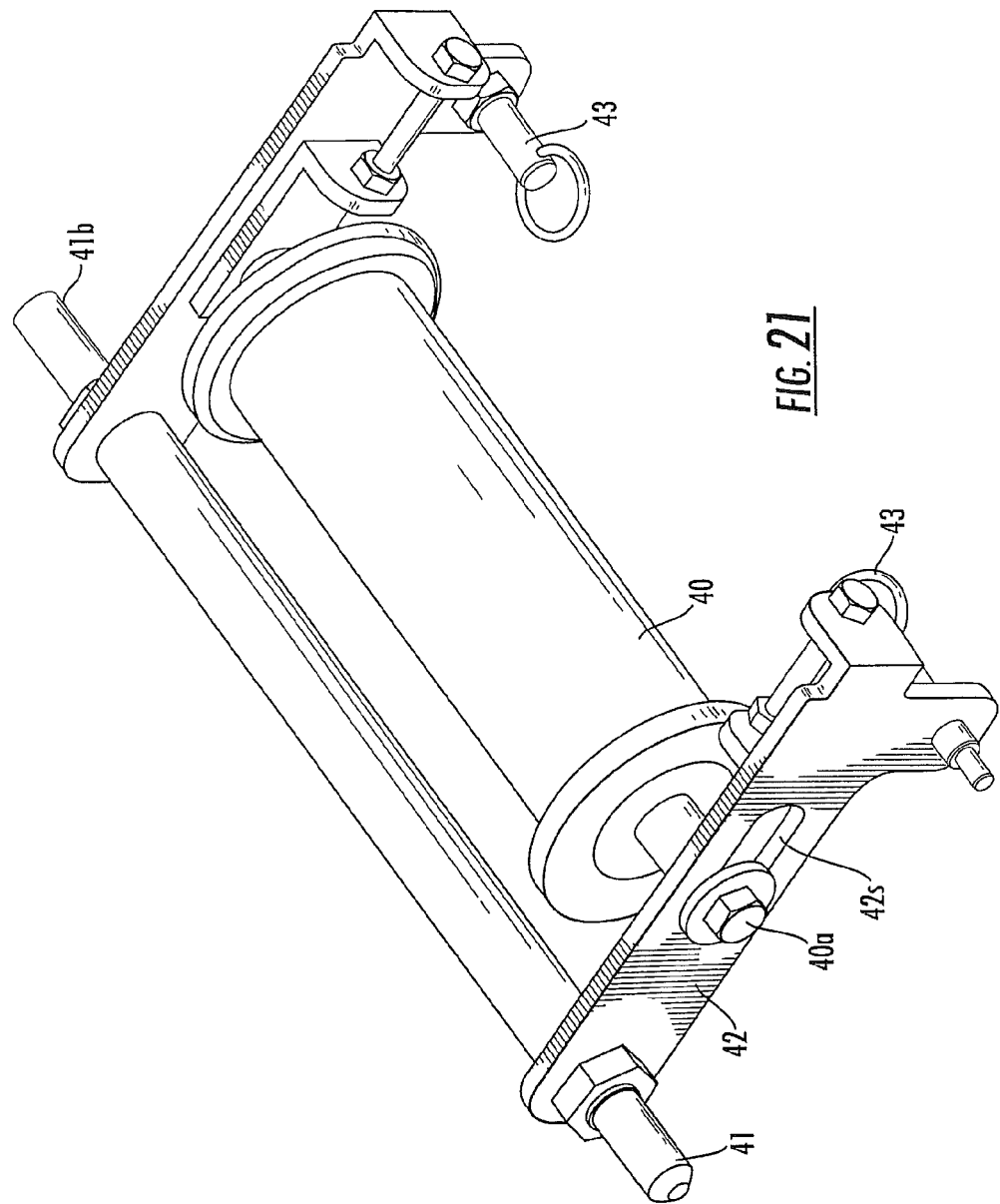
FIG. 21 is a side perspective view of an adjustable wheel assembly configured for use with a telescoping conveyor according to embodiments of the present invention.

FIG. 21 illustrates the adjustable wheel subassembly 43, which includes slots 42s on opposing sides of the bracket 42 that allow the axial location of the idler 40 to be adjusted. In this embodiment, as shown, the bracket 42 can include a substantially axially extending slot 42s that allows for the idler 40 to move axially to adjust tension in the belt 15, once the belt 15 is loaded to the conveyor 10. The bracket 42 can pivot with the idler 40 to translate as shown in FIG. 5, typically downward and forward, to allow for removal of the belt 15 as will be discussed below.

Referring again to FIGS. 1A-1D, these figures also illustrate that the system 10, 10' may also include a package stop 50 that mounts to frame 10f at user selectable locations. The package stop 50 can be configured as a "trip roller" that includes a proximity sensor that senses an end portion of a pumped encased product and communicates with the clipper to notify the clipper it is time to void, then clip. The sensor data can also be used to regulate the pump. The stop 50 can reside above the floor 15f and can be attached at any desired axial location, typically to siderail 50r. The vertical position of the stop can also be adjusted. The system 10 can also include an HMI (Human Machine Interface) control module 75 as is known to those of skill in the art.

Figure 2F:
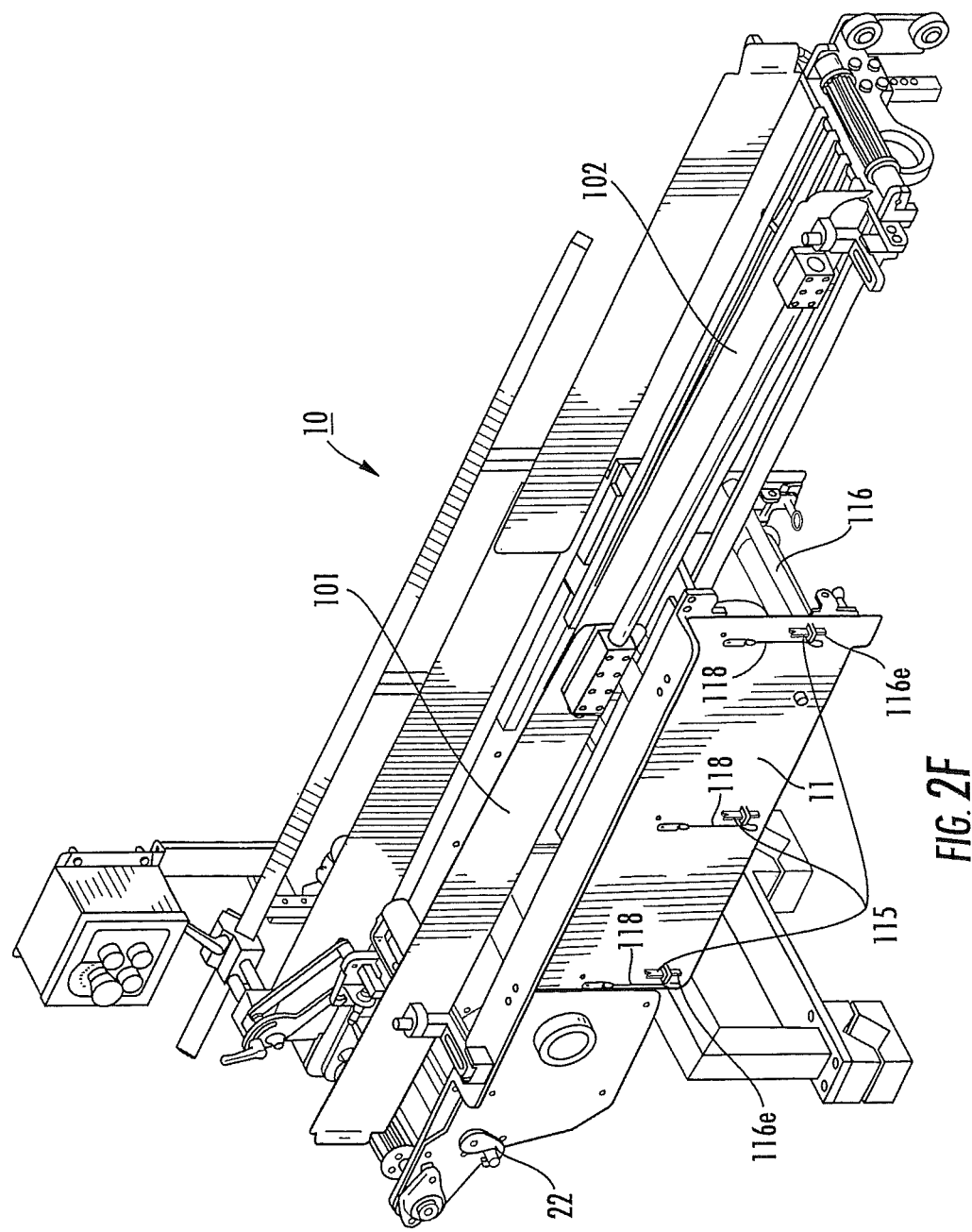
FIG. 2F is a side perspective view of the device shown in FIG. 2E but illustrating the conveyor and sidewalls in the extended configuration according to embodiments of the present invention.

FIGS. 2A-2F illustrate the system 10 without the belt 15. FIGS. 2A-2F also illustrate the system 10 with axially extendable and retractable product guides 100 (also described herein as upwardly extending sidewalls) that reside above the conveyor floor 15f. FIGS. 2A and 2B illustrate the conveyor system 10 in a retracted configuration and FIGS. 2C and 2D illustrate the system 10 in the extended configuration. As shown, the system 10 includes an upwardly extending sidewall 100 with the floor 15f therebetween.

Referring to FIGS. 1C, 2A, 2C, 2E, each product guide 100 can include first and second sidewalls (shown as relatively thin planar plates) 101, 102 with a sliding member, such as a rod or bar, 103 that can slide through a bracket 101b to axially extend or retract the sidewalls 101, 102. As shown, the rearward (in the direction toward the clipper) sidewall 102 can be attached to member 104 that mounts to the translating portion of the conveyor 10 to reciprocally translate the first sidewall 102 substantially in concert with the floor 15f. The sliding member (such as a rod or bar) 103 is shown as mounted on an outside of the sidewall(s) with the sidewalls 101, 102 closely spaced to slide on the inside surface (closer the actual product or conveyor floor 151) to inhibit obstruction of the product flow, but other sliding or translating configurations may be used. Also, one or more separate actuators may be used to translate the guidewalls 100 (not shown) rather than translate the guidewalls using the same actuator(s) as the telescoping conveyor 10. Also, although shown as having the rearward guidewall 102 move upstream to extend with the telescoping floor 151, the system can be reversed with the forward guidewall 101 configured to extend relative to the rearward guidewall 102.

As shown in FIGS. 2B, 2D and 2E, at least one of the guides 100 can be configured to angle inward, such as by tapering laterally inward along the axial direction. This can help direct the product to travel toward the stop member 50. This may be appropriate for devices that package a relatively wide variety of selectable size packages; the size of packages (diameter, length, weight) may be adjusted based on, inter alia, pump speed, food type, conveyor speed, casing material, conveyor stroke distance and the like.

FIG. 2F also illustrates that releasable locking members 115, such as pins held to the wall 11 with tethers 118 such as chains can be used to releasably attach the housing wall 11 to the frame 10f. The locking members 115 can be tapered pins (tapered from large to small, in the direction of ground) to facilitate tight retention of the wall 11 against the frame 101. As shown, the end portions 116e of three axially spaced apart cross members 116 can extend through the wall 11 and locking members can be used to align the wall to the frame 10f and/or releasably lock the wall 11 in position. Although the locking members 115 are shown as straight pins, cotter pins or other locking member configurations can be used. The moveable end portion 10u can be configured as the sliding subassembly with all the conveyor sliding members integrated as a single subassembly 10s to be light-weight, which takes less force to move the telescoping floor 15f and also increases speed, reducing cycle time.

Figure 3:
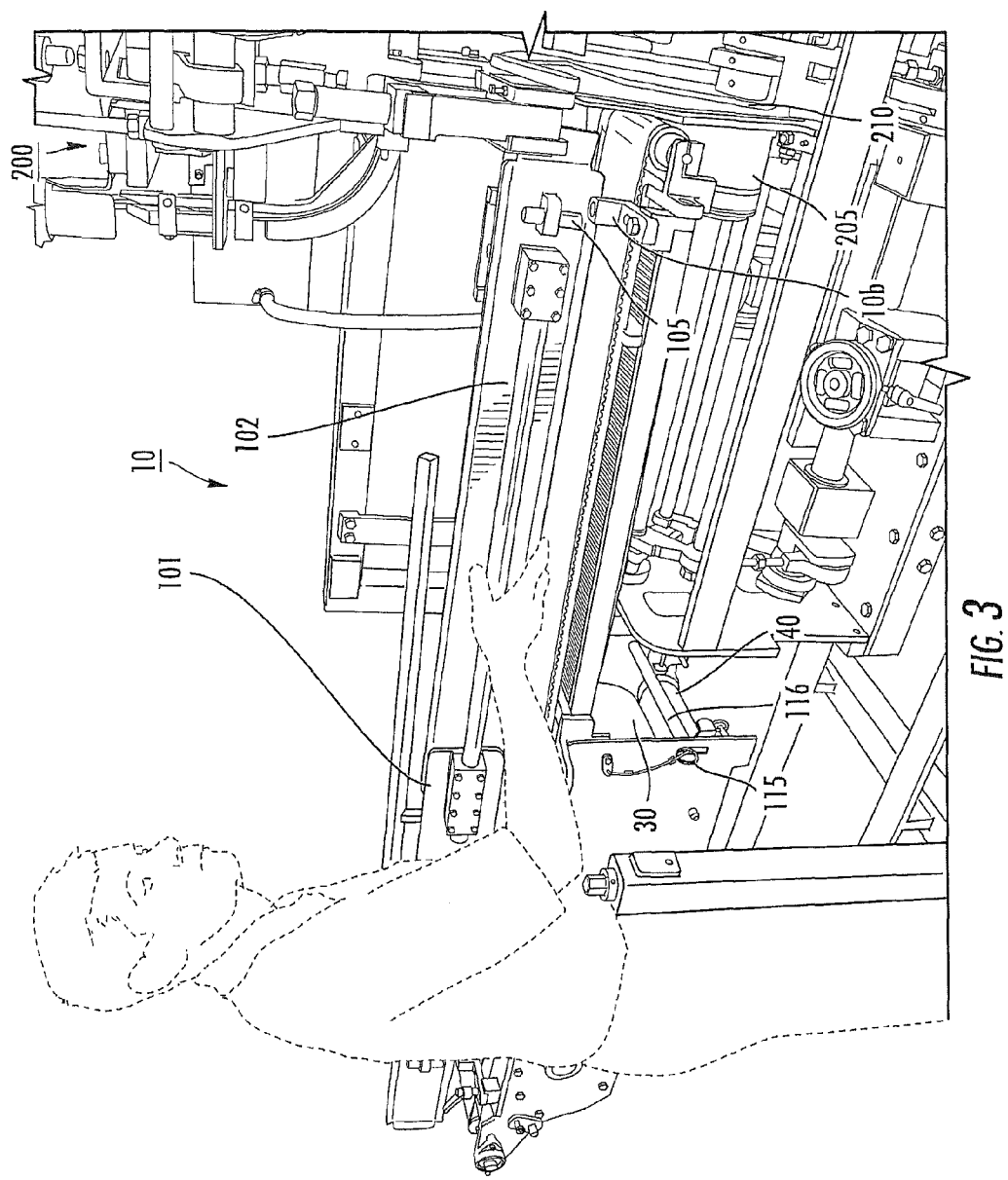
FIG. 3 is a side perspective view of the device shown in FIG. 1A illustrating removable product guides that can be used with the device according to embodiments of the present invention.

FIG. 3 illustrates that the guidewalls 100 can be detached from the system 10. As shown, the guidewalls 100 can include at least one mounting pin 105 (typically two axially spaced apart pins) that can be snugly matably received in a respective bracket 10b attached to the frame 10f. Thus, the guidewalls 100 can be slidably lifted off the conveyor system 10. The guidewalls 100 can be configured to be adjustably positioned relative to the conveyor floor 15f and each guidewall 100 on a respective side of the floor 15f can be configured the same as the other. Further, each, or only one, end portion of each side of the guidewalls 100 can be slidably mounted to the frame 10f so as to be able to be moved transversely in or out to adjust for different size products as desired.

Figure 8:
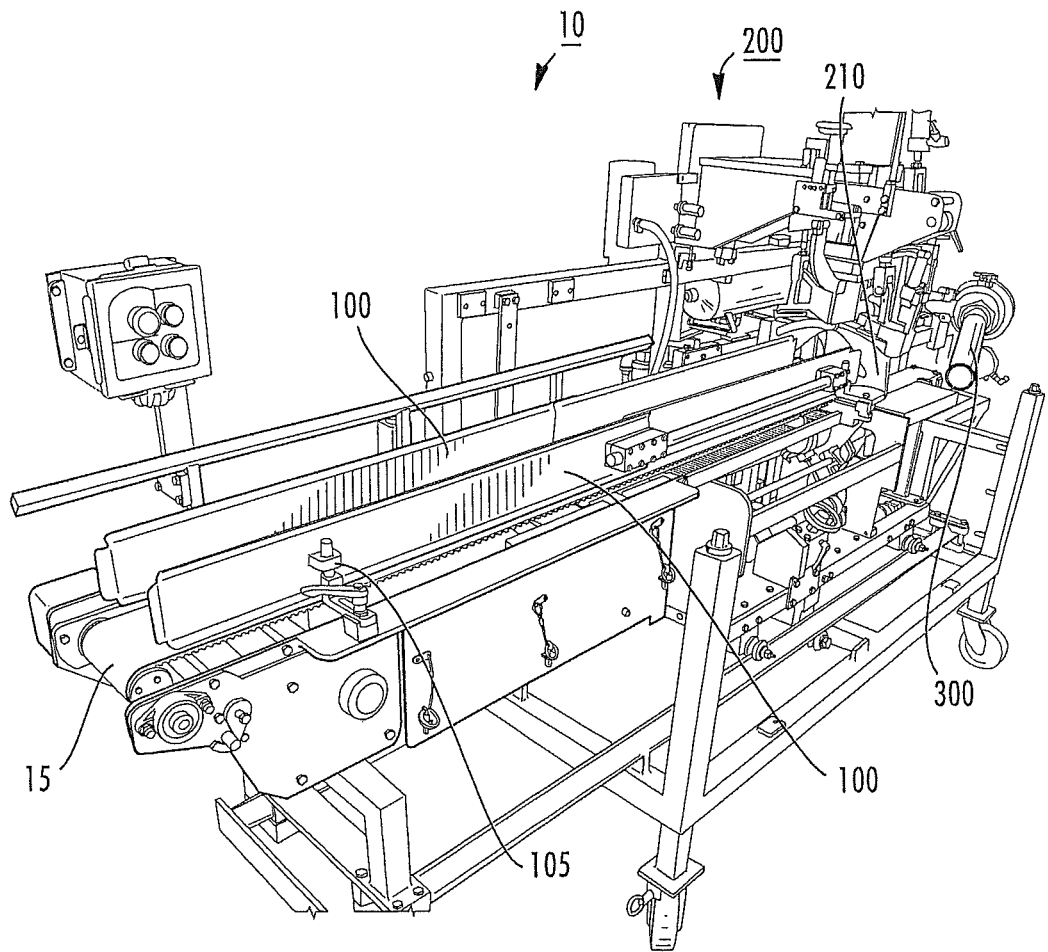
FIG. 8 is a discharge end perspective view of a packaging apparatus with a telescoping conveyor according to embodiments of the present invention.
Figure 9:
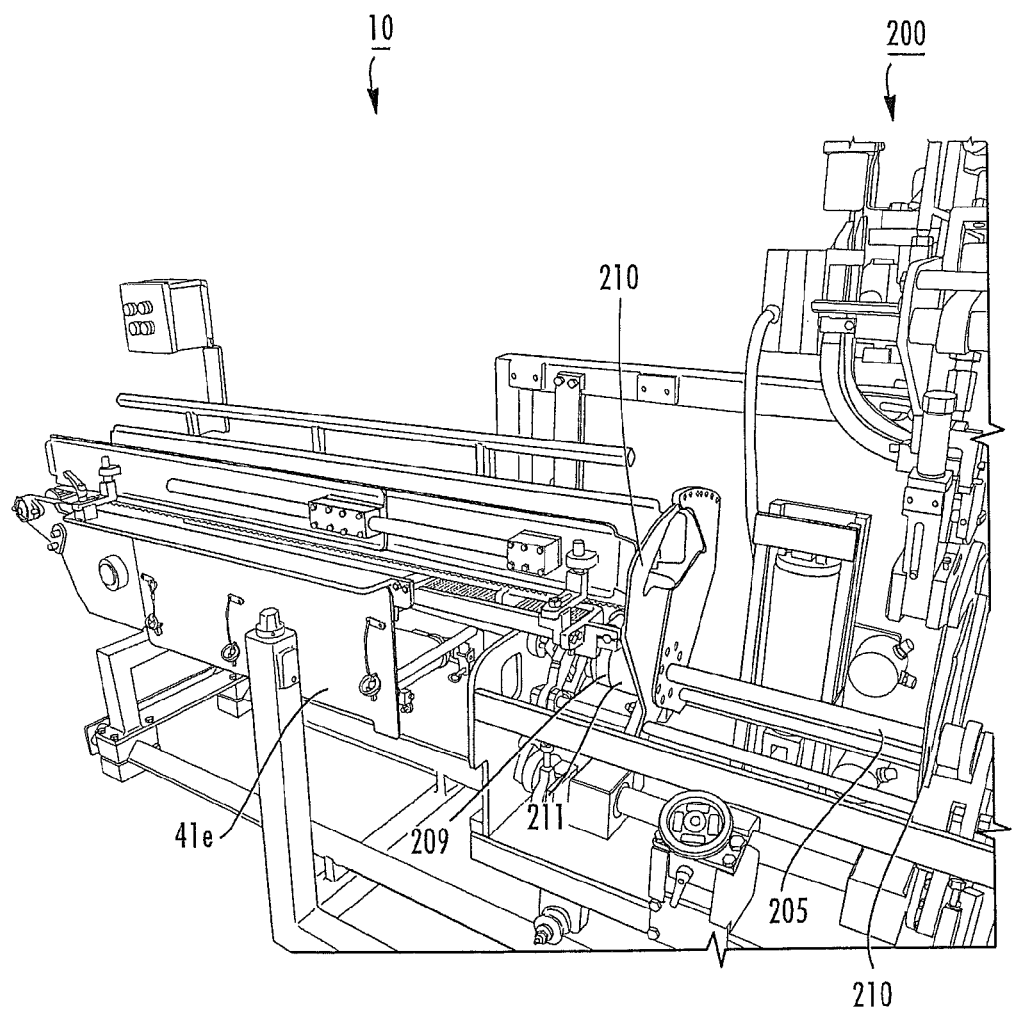
FIG. 9 is of a side perspective view of the device shown in FIG. 8 taken looking downstream toward the discharge end according to embodiments of the present invention.
Figure 11:
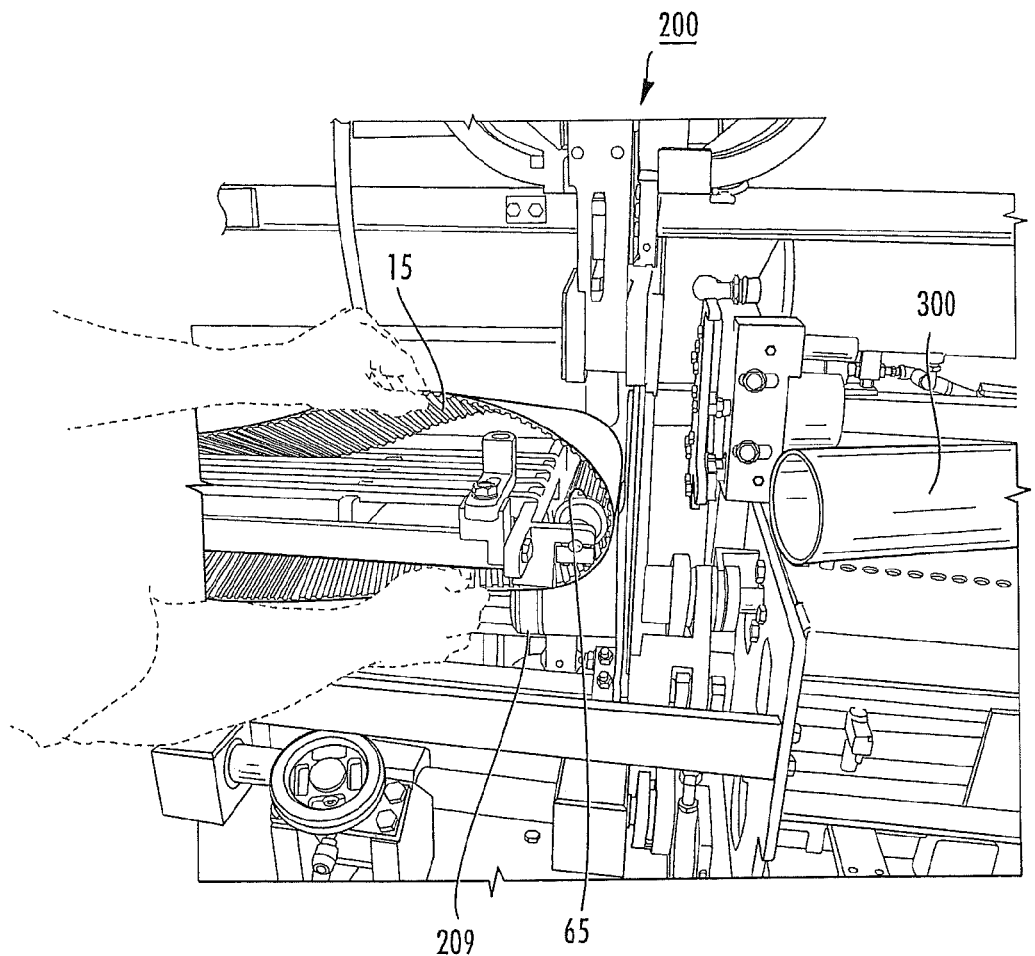
FIG. 11 is a side view of the intake end portion of the device shown in FIG. 10, illustrating the belt being loaded onto the apparatus according to embodiments of the present invention.

FIG. 3 also illustrates that the conveyor system 10 can be used with a clipper 200 residing downstream thereof, proximate the receiving end of the conveyor system 10. Clippers are well known to those of skill in the art as discussed above. The clipper 200 can include voiders 210 as is also known to those of skill in the art. As shown in FIGS. 3 and 9, the system 10 includes a shaft 205 in communication with an actuator/rod (which may reside upstream of the horn and is typically pneumatic) that automatedly drives the reciprocal translation of the conveyor. As discussed above with respect to FIG. 22B, as shown in FIG. 9, at least the downstream-most voider 210 may also be in communication with the shaft 205 to axially translate substantially in concert with the conveyor 10. FIGS. 8, 9 and 11 illustrate other views of the clipper 200 and a horn 300 that pumps flowable meat emulsions for packaging that may be particularly suitable for use with the telescoping conveyor 10.

Figure 4:
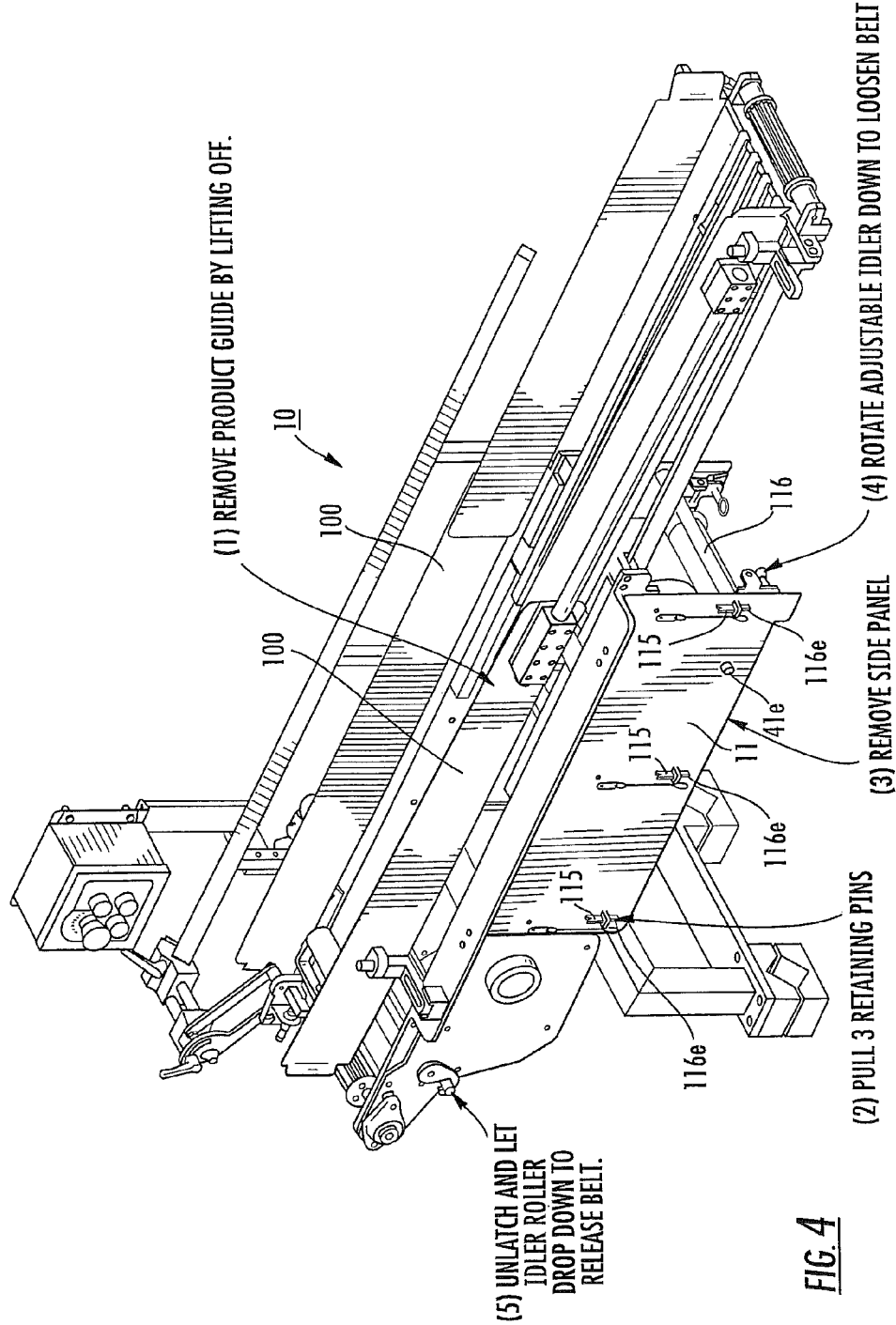
FIG. 4 is a side perspective view of the device shown in FIG. 1A illustrating the product guides and exterior housing walls in position according to embodiments of the present invention.

FIG. 4 illustrates exemplary steps that can be used to release the belt 15 from the conveyor 10 for cleaning (or repair or replacement). As shown, at least one of the product guide(s) 100 can be lifted off the system 10 (typically only one is removed). Then, the retaining pins 115 are pulled from the apertures in the end portions 116e of laterally extending members 116. (These steps can be reversed or carried out substantially concurrently). Next, the side panel or sidewall 11 can be removed. The idler 40 can then be translated (typically pivoted or rotated) down to loosen the belt 15. Next, when the embodiment shown is used, the forward idler 20 can be unlatched from holder 22 and the idler roller 20 can drop or be moved down to release the belt 15. This step is omitted for the embodiment shown in FIGS. 1C and 1D. The rearward idler roller 30 can be rotated and/or pivoted (typically forward). The forward idler roller 20 and rearward idler roller 30 can be moved earlier in the belt releasing steps than that noted in this exemplary process.

FIG. 5 illustrates the conveyor system 10 with the product guide 100 removed and the idler rollers 20, 30, 63, 65 and idler 40 held to the frame 10f (directly or indirectly) with members 20, 30, 40 translated from the operative configurations in a belt release and reload configuration. For the embodiment shown in FIGS. 1B and 1C, the configuration for load/release is similar to that shown in FIG. 5, but with the omission of member 20 and mounting member 22.

Figure 7A:
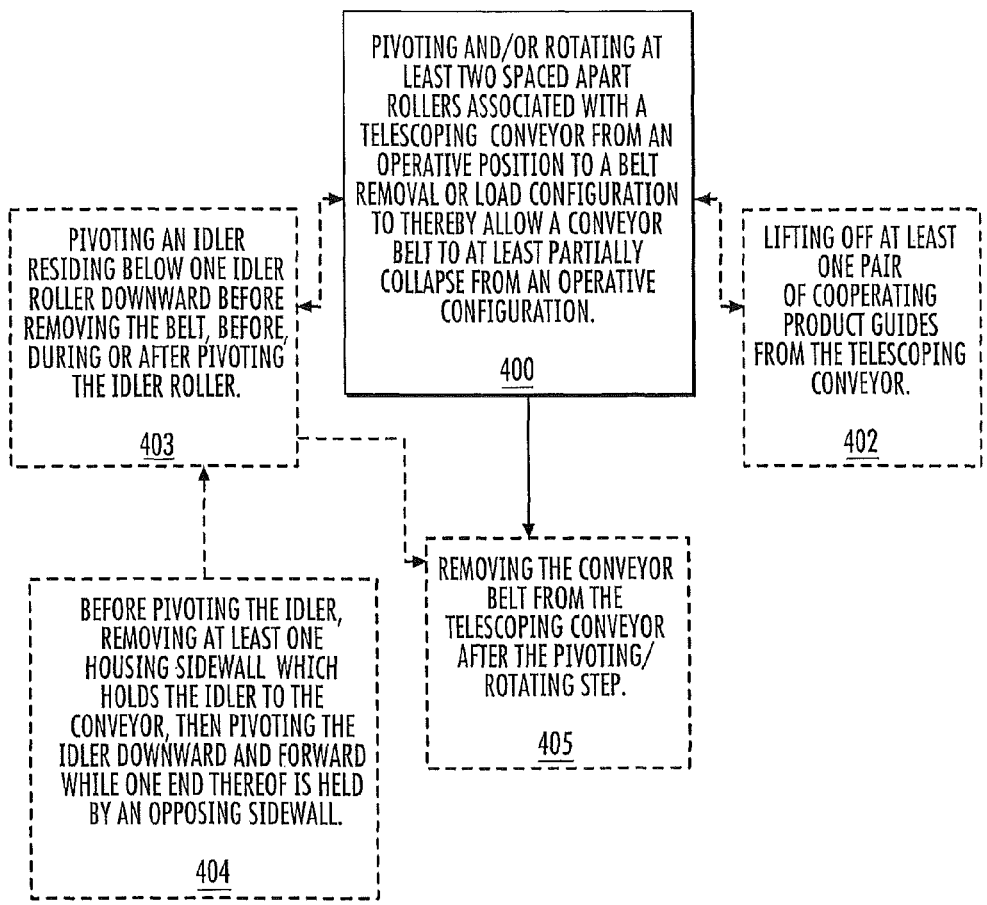
FIG. 7A is a flow chart of operations that can be used to remove a belt from a telescoping or other conveyor type for cleaning, repair, replacement or other operations, according to embodiments of the present invention.

FIG. 7A illustrates a flow chart of operations for methods that can be used to remove a belt from a telescoping conveyor. As shown, at least one, typically at least two, spaced apart rollers (idler or idler rollers) associated with a telescoping conveyor can be pivoted and/or rotated from an operative position to a belt removal or load configuration to thereby allow a conveyor belt to at least partially collapse from an operative configuration (block 400). The conveyor belt can be removed from the telescoping conveyor after the pivoting step (block 405).

In some embodiments, the method may also include lifting off at least one pair of cooperating product guides from the telescoping conveyor (block 402). The pivoting/rotating (i.e., translating) step can include pivoting the idler residing below one of the idler rollers downward before removing the belt, either before, during or after pivoting the idler roller (block 403). Optionally, before pivoting the idler, the method can include removing at least one housing sidewall which holds the idler to the conveyor frame, then pivoting the idler downward and forward while one end thereof is held by an opposing sidewall (block 404).

Figure 7B:
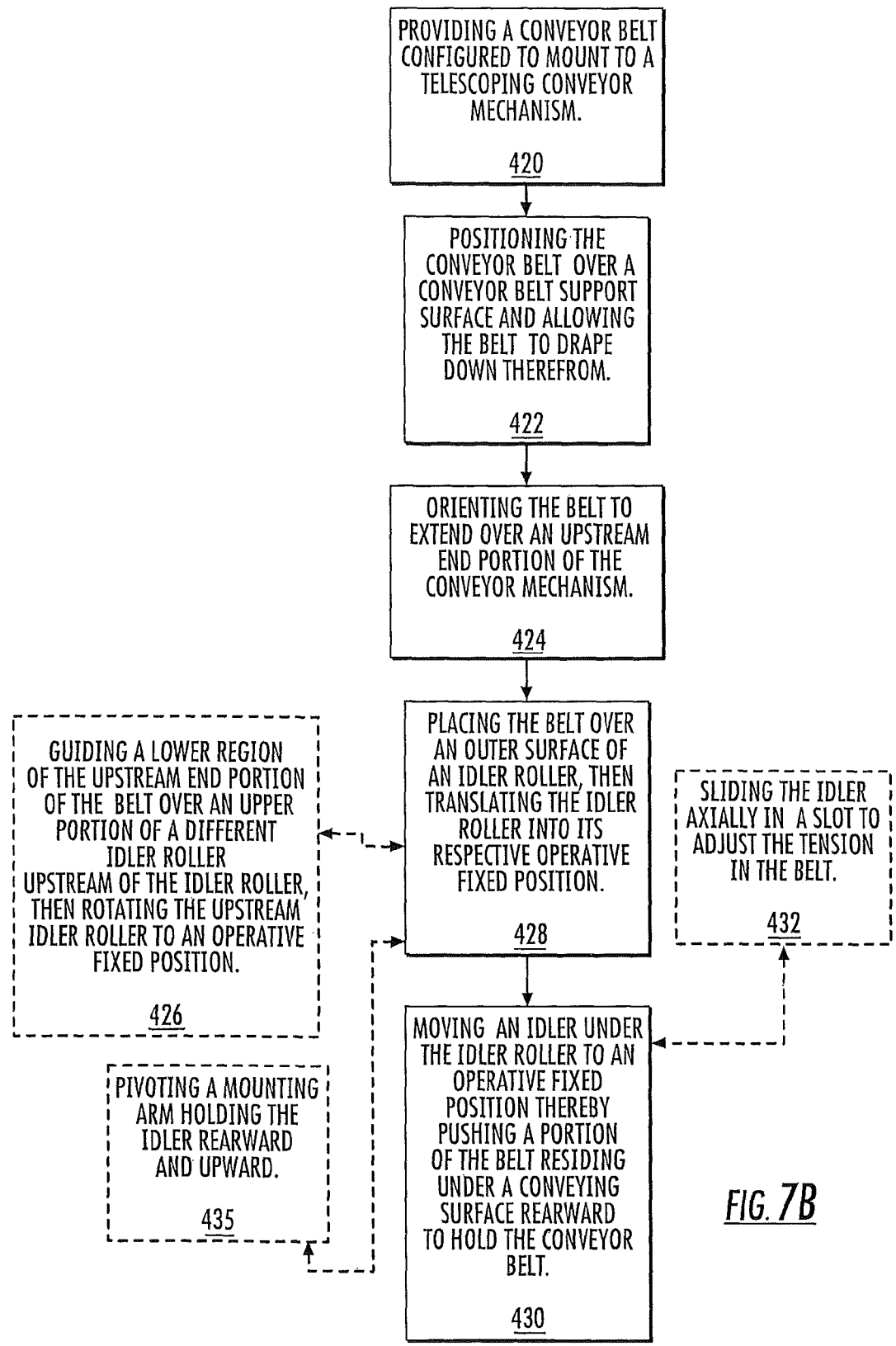
FIG. 7B is a flow chart of operations that can be used to load a belt onto a (telescoping) conveyor device according to embodiments of the present invention.

FIG. 7B illustrates operations that can be used in methods to load a belt to a telescoping conveyor. As shown, a conveyor belt configured to mount to a telescoping conveyor mechanism is provided (block 420). The conveyor belt is placed over a conveyor belt support surface and allowing the belt to drape down therefrom (block 422). The belt is oriented to extend over an upstream end portion of the conveyor mechanism (block 424). The belt is guided over an outer surface of an idler roller, then the idler roller can be translated (typically pivoted) into its respective operative fixed position (block 428). An idler residing upstream of the idler roller is translated to an operative fixed position, thereby pushing a portion of the belt residing under a conveying surface of the belt rearward in response thereto to hold the conveyor belt in an operative configuration (block 430).

Optionally, a lower region of the upstream end portion of the belt is placed over an upper portion of a first idler roller, then the idler roller is rotated to an operative fixed position and latched in position (block 426).

The belt loading method may optionally also include guiding a mounting arm holding the idler rearward and upward and attaching a pin to a mounting bracket held by a vertical housing sidewall to lock the idler to the sidewall (block 435). Also, the method may include sliding the idler axially in a slot to adjust the tension in the belt (block 432).

FIG. 8 is an end perspective view of a conveyor system 10 with the belt 15 in place and the other components in an operative configuration. As shown, the system 10 is aligned with a packaging apparatus with a clipper 200, voider 210 and horn 300 (shown rotated out of axial alignment). Generally stated, when the clipper 200 can include a clip path that directs a string of clips along a (curvilinear) rail to a clip window. As is well known, a punch can automatically force a forwardmost clip down the clip window and into the clip gate to cooperate with a lower forming die to wrap the (at least one) clip around a trailing or leading gathered edge portion of a product package to close or seal the package. Generally stated, the clips are applied to the gathered packaging material to deform to wrap around and close or seal the product therein. The clip(s) can be tightly pressed to form a seal against the casing that can be sufficiently strong so as to be able to hold a vacuum of about 16 mm Hg for about 24-48 hours. Examples of suitable clips include metallic generally "U"-shaped clips available from Tipper Tie, Inc., in Apex, N.C. Other clips, including elastomeric clips or other clip materials and clip configurations may also be used.

FIG. 9 is a side perspective view of the system 10 with a portion of the clipper 200 illustrating the voider plates 210 with at least one forward voider plate attached to a shaft 205 with a hub 211 that translates the receiving end portion of the conveyor 10.

Figure 10:
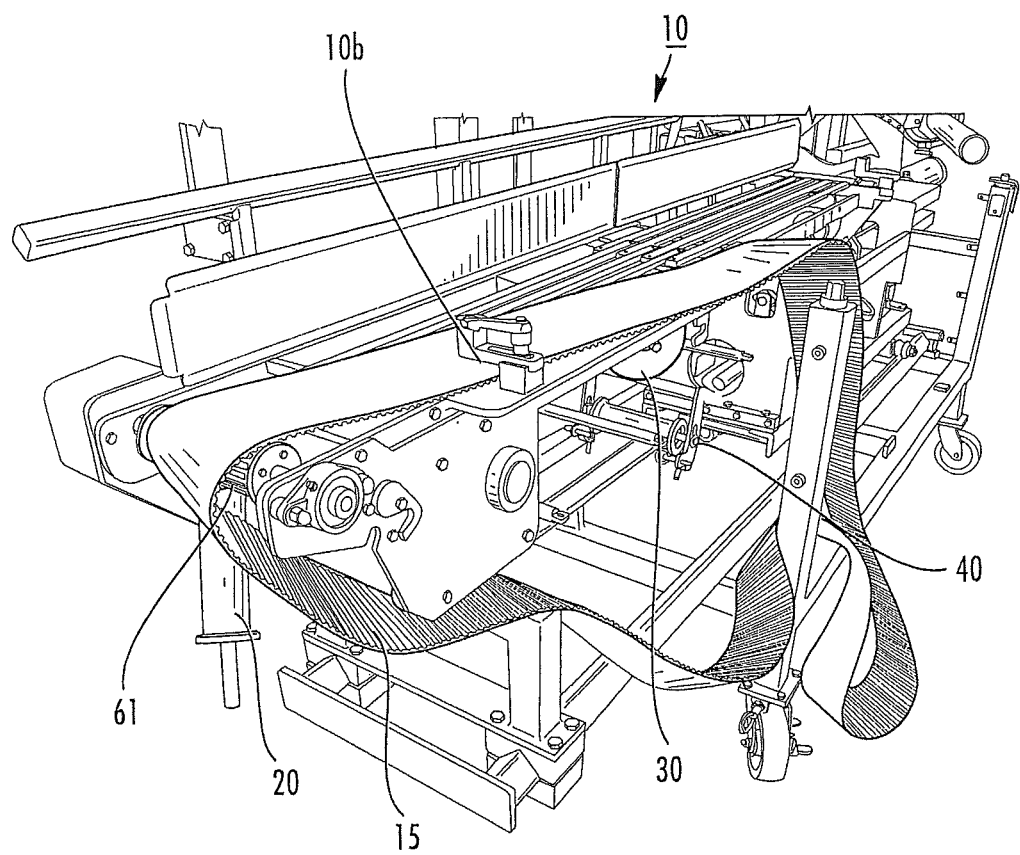
FIG. 10 is a discharge end perspective view of the device shown in FIG. 8, illustrating idlers pivoted away from an operative position for loading or unloading the belt according to embodiments of the present invention.
Figure 12:
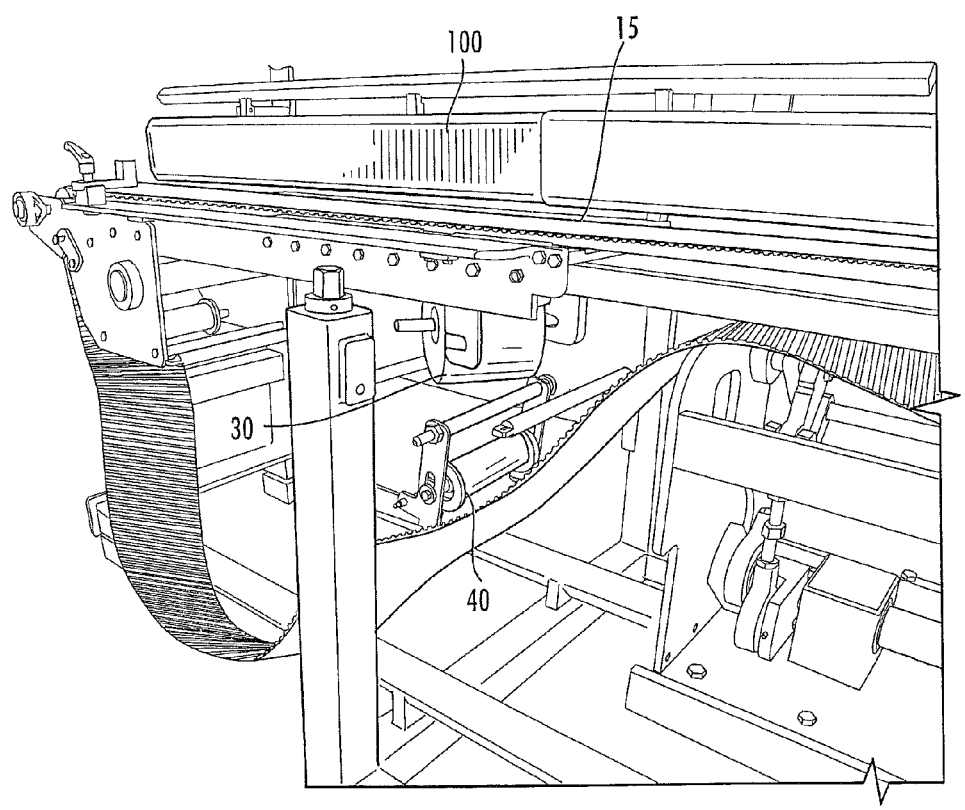
FIG. 12 is a side perspective view of the device shown in FIG. 11, taken looking downstream, illustrating the belt configuration during a loading sequence and orientation of idlers/rollers according to embodiments of the present invention.
Figure 13:
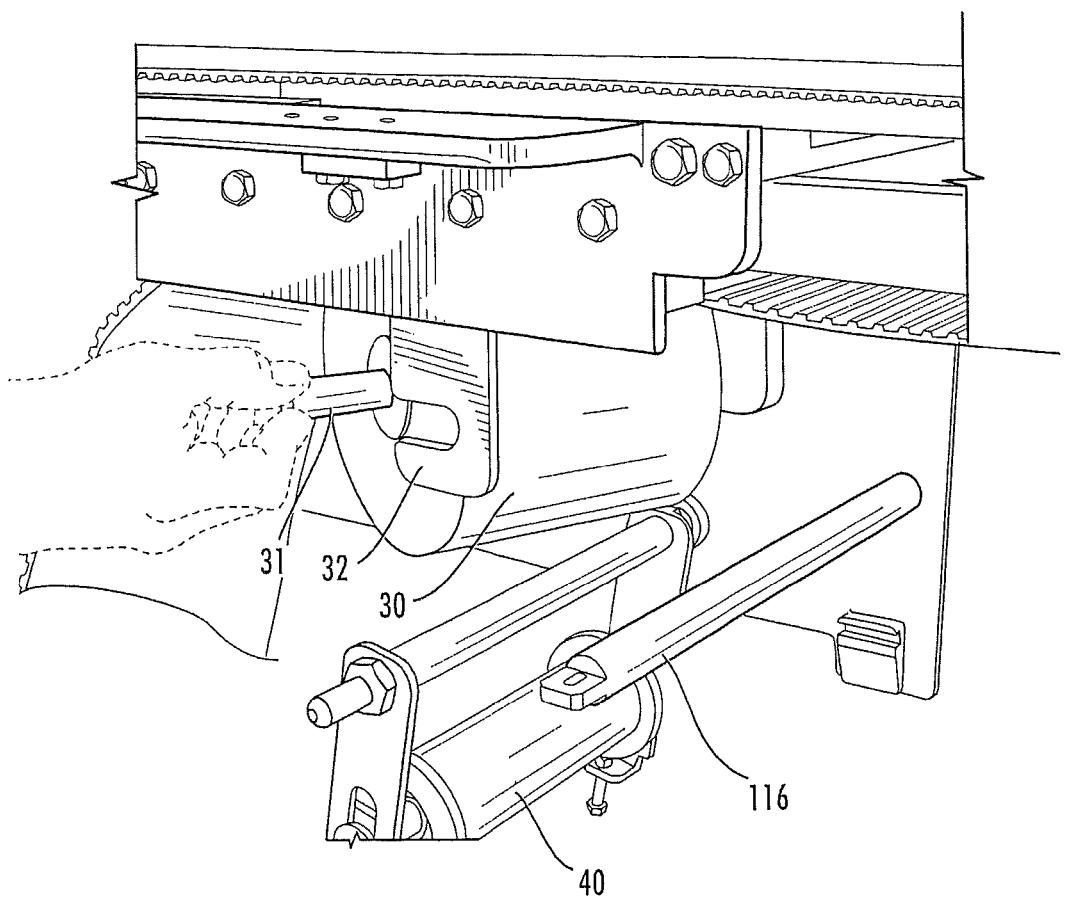
FIG. 13 is a side perspective view of the device shown in FIG. 12 illustrating the idler roller being mounted in operative position with the belt thereover according to embodiments of the present invention.
Figure 17:
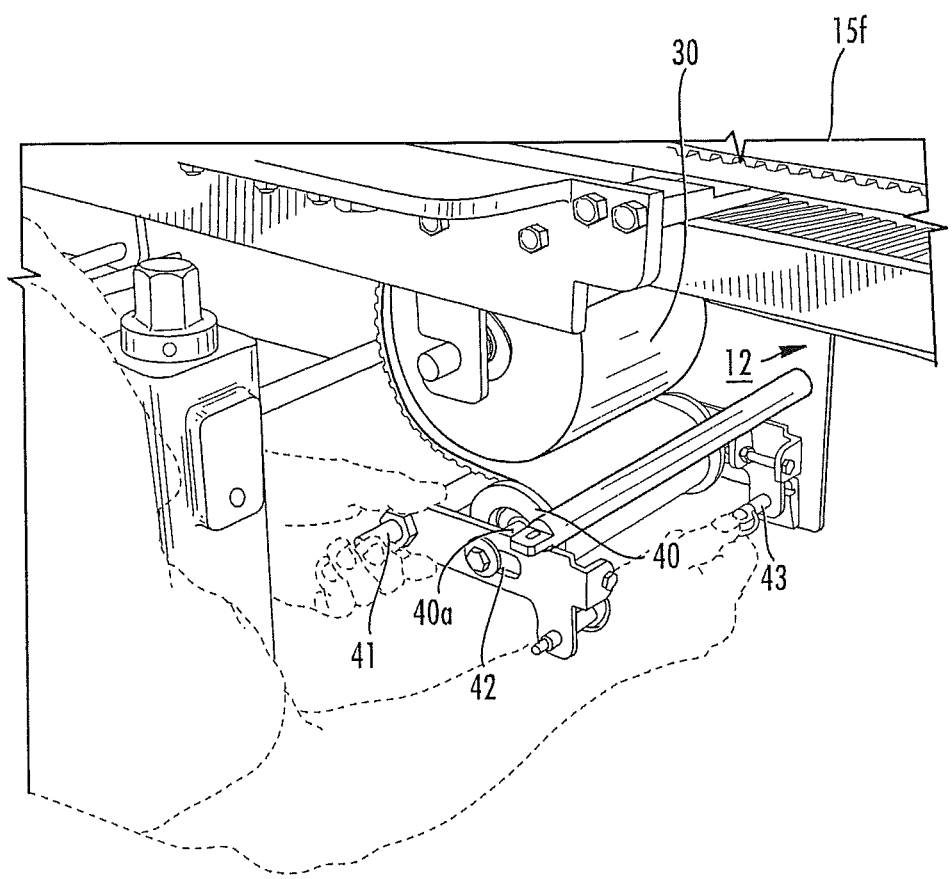
Figure 18:
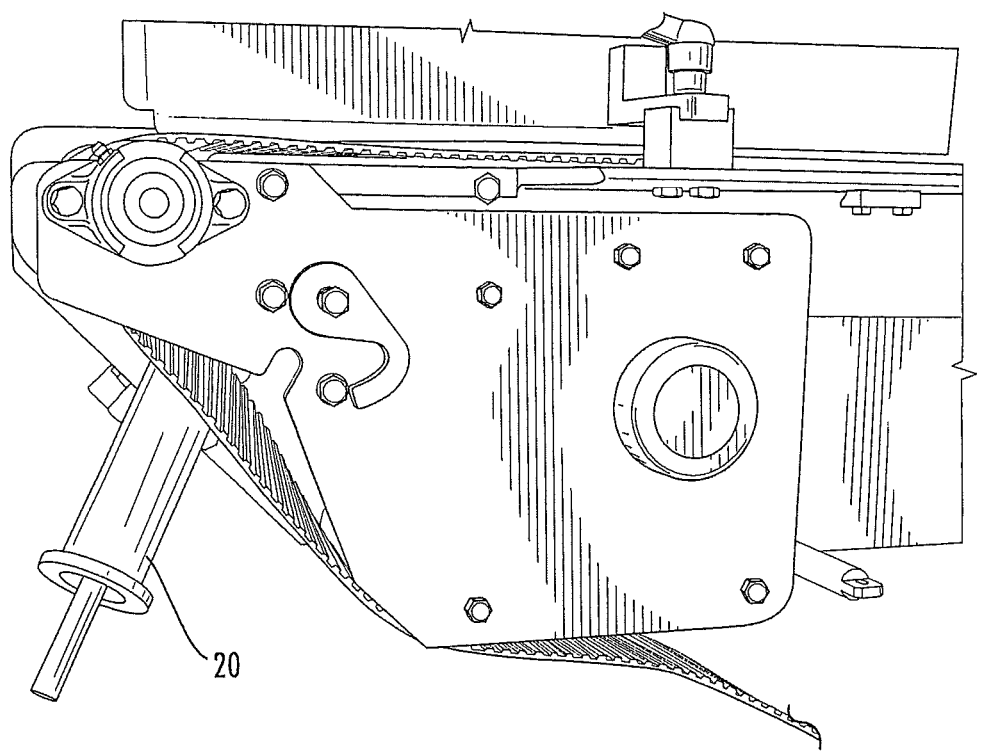
FIGS. 18, 19A and 19B are views of the device shown in FIG. 10 illustrating a sequence of operations that can be used to orient the belt and forward idler into operative position according to embodiments of the present invention.
Figure 19A:
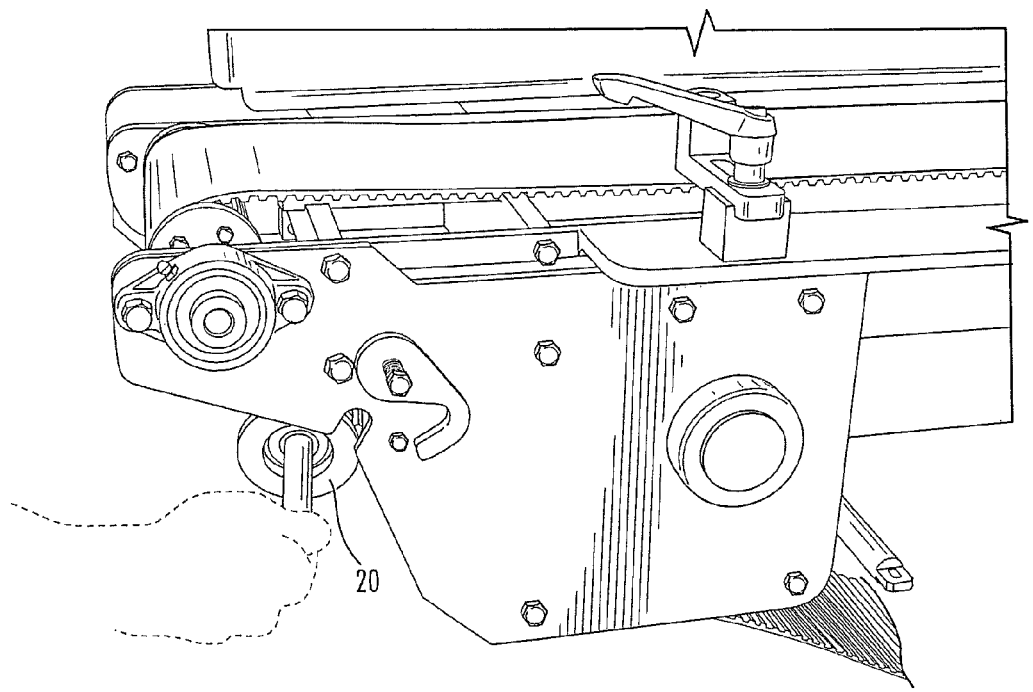
Figure 19B:
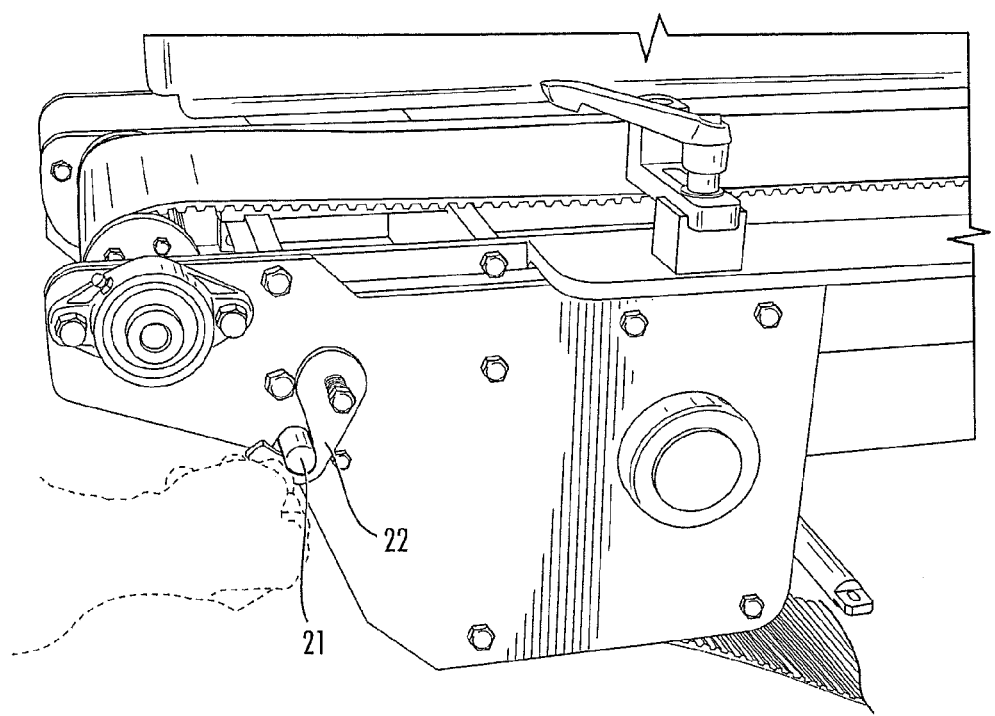
Figure 20:
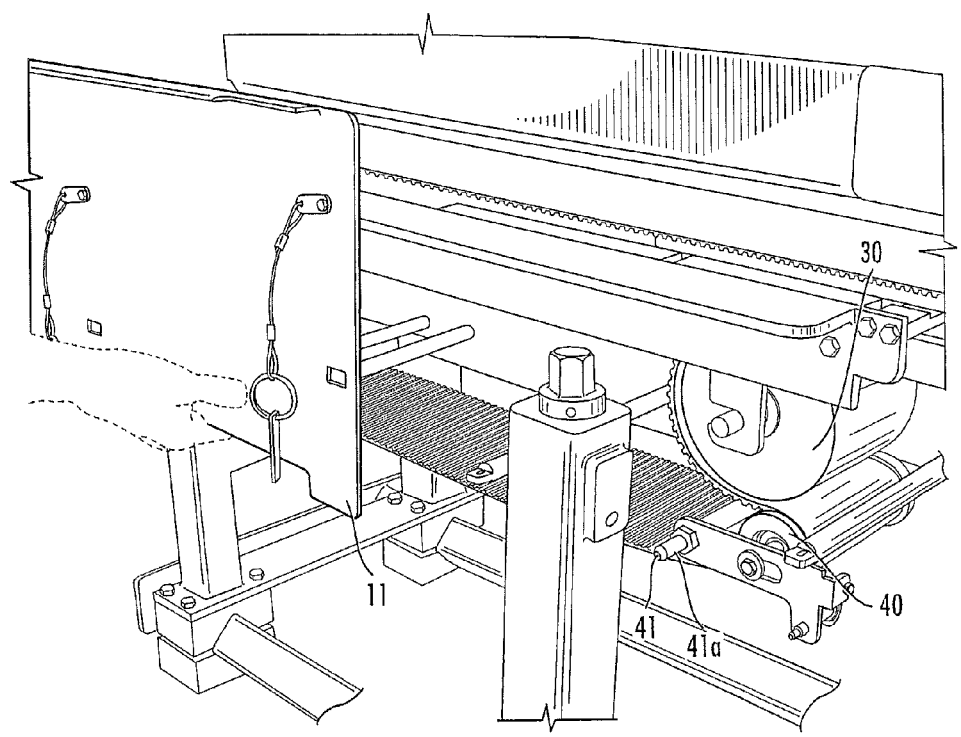
FIG. 20 is a side perspective of the device shown in FIG. 10 illustrating the housing sidewall being placed back onto the device after the belt is loaded according to embodiments of the present invention.

FIG. 10 illustrates an exemplary ready-to-load belt configuration of the telescoping conveyor system 10. As shown, the outer product guide 100 is removed and the first and second idler rollers 20, 30 and the idler 40 are all pivoted out of their operative configuration but each is held to the system frame 10f by a respective one end portion of a laterally extending mounting arm 21, 31, 41 (directly or indirectly). The belt 15 is loosely draped over the frame 10f and may be held by the bracket 10b that holds the guide 100. FIGS. 11 and 12 illustrate preliminary belt loading steps that can be used to position the belt. FIGS. 13-17 illustrate belt placement using the idler roller 30 and idler 40. FIGS. 18-20 illustrate belt placement using the idler roller 20. The steps shown in FIGS. 18, 19A and 19B may be carried out before those shown in FIGS. 13-17. As noted above, with respect to the embodiment shown in FIGS. 1C and 1D, the loading steps are similar with the omission of roller 20 and the associated steps.

Figure 16:
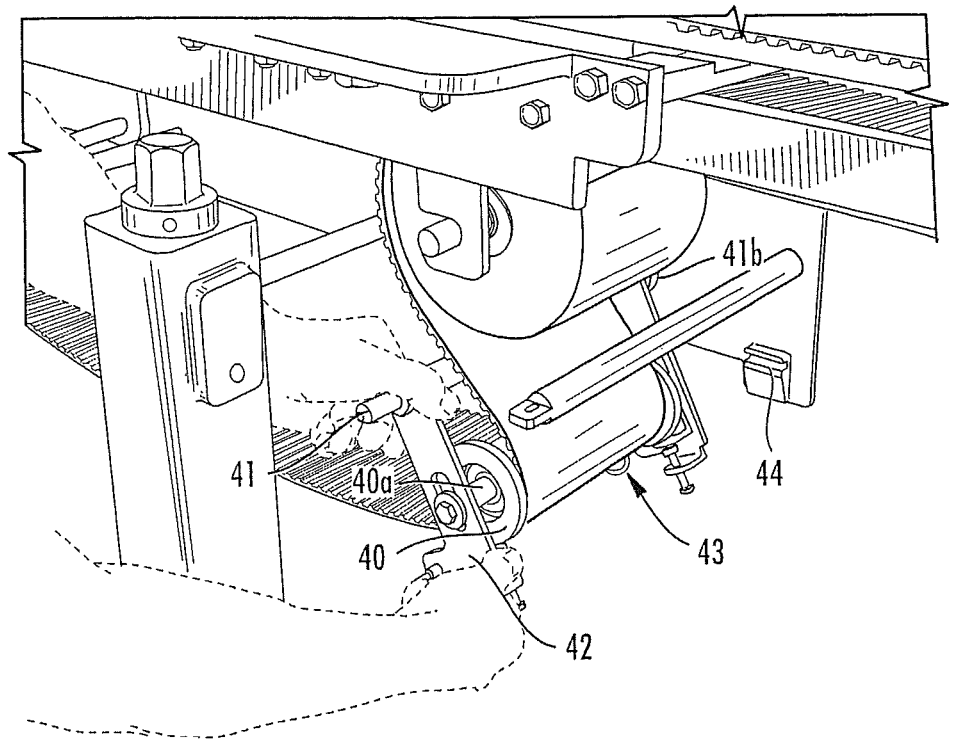

FIG. 16 illustrates that the idler 40 can be pivoted rearward via a laterally extending pivot arm 41 that has a first end 41a pivotably attached to the frame 10f (typically to sidewall 12). The other end 41b mounts to (typically extends through) the other sidewall 11. The idler 40 pivots upward so that bracket 42 aligns with mounting channel 44 to help hold the idler 40 in position as shown in FIG. 17. A locking pin 43 can be used to lock the idler bracket to the wall 12. A similar configuration may be used to hold the other portion of the idler bracket 42 to the other wall 11.

The packaging system can pump product through a horn 300 and encases the product in casing material as it exits the horn 300. In operation, the encased product can be fed to the voiding/clipping apparatus 200/210 that can be configured to produce a series of single products or a series of chained encased products using either of the two types of casings. A clip is applied to the beginning portion of a casing, food is pumped into the casing, and the filled casing is moved downstream from the filling point adjacent the discharge end of the horn. The filling can be interrupted momentarily while excess product is voided (pushed away from a clip zone on the package) and one clip can be applied (or two clips can be applied concurrently) to the package and/or casing at proximate but spaced apart lateral locations in the clip zone.

The clippers 200 of the instant invention can be operated to manually, semi-automatically or automatically apply closure clips to seal or hold products held in the casings and/or netting. Examples of exemplary devices and apparatus used to void, clip, package and/or tension casing material are described in U.S. Pat. Nos. 5,085,036, 5,203,760, 4,847,953; 4,675,945; 5,074,386; 5,167,567; and 6,401,885, and U.S. Patent Application Publication No. US-2005-0039419-A1, the contents of which are hereby incorporated by reference as if recited in full herein.

The target products for packaging may be a linked chain of elongated extruded product held in a casing or discrete objects held in netting or other materials. The casing can be any suitable casing (edible or inedible, natural or synthetic) such as, but not limited to, collagen, cellulose, plastic, elastomeric and/or polymeric casing.

The encased product can be a food product, such as a meat product. Exemplary meat products include, but are not limited to, strands of meat (that may comprise pepperoni, poultry, and/or beef or other desired meat), and processed meat products including whole or partial meat mixtures, including sausages, hot dogs, and the like. Other embodiments of the present invention may be directed to seal other types of food (such as cheese) or other product in casing materials or enclose the product in packaging material. Examples of other products that can be sealed in casing material include powders such as granular materials including grain, sugar, sand and the like or other flowable materials including wet (similar to that held conventionally in cans) pet food or other powder, granular, solid, semi-solid or gelatinous materials. Examples of products that can be packaged in netting or other materials also include non-pumpable items, such as, for example, bone-in or boneless hams (half, whole or other size), fresh, frozen or previously frozen turkeys (whole), and other discrete objects. The product may be packaged for any suitable industry including food, aquaculture, agriculture, environmental, chemical, explosives, or other applications.

While described with respect to a certain type of operation, telescoping conveyors and clippers of the instant invention are not limited thereto as they may be used with many different types of equipment (with non-pumpable product and chutes, with netting, without netting, with standard casings rather than heat-seal casings, and the like). In some embodiments, in operation, during the pumping process, the casing is drawn off the product horn, stuffed with product, and concurrently encased in (elastic) netting. The moisture and/or exudates(s) in the product can cause the casing to cling to the product and seal the overlapping layers of the casing together along a lower lap seal.

Typically the downstream end portion of the netting and casing is clipped or closed to capture the discharged product therein. As the product is discharged from the horn 300 it expands the casing and netting to create a package shape. The netting is stretched tightly over the product with the casing therebetween. The netting can hold the package together during the cooking or other subsequent process and can provide a uniform, aesthetically appealing crosshatch pattern on the finished product. The size of the package formed can vary depending on the casing size, the length of time the filler is activated to discharge product, the tension of the netting, and/or the conveyor speed of the conveyor receiving and holding the encased product. Once the package is filled, the voider 210 can void a target portion of the package and the clipper 200 can apply one or more clips to the voided region of the package. Typically two clips are applied and the package is severed between the clips using an automatically actuated knife, as is well known to those of skill in the art. However, a series of linked products can be formed (such as a product known as "beer balls") where a single clip is placed between the linked products and two clips can be applied to stop the linked package and start another series.

The packaging system can be configured to mount other horns and run different casing types, such as a heat seal horn and a shirred casing horn. Thus, the apparatus can be a multi-modal device that accepts at least two different horns, each operating using a common Human Machine Interface, such as, for example, the HMI 75 (FIG. 1) or a primary HMI disposed upstream thereof and clipper/voider 200/210 assembly to allow more manufacturing adaptivity. A horn that may be configured to provide casings can be one that processes a slug-type natural or artificial casing that unwinds, advances, stretches and/or pulls to form the elongate casing over the desired product. Another type of casing is a heat-sealed tubular elastomeric casing formed by seaming a thin sheet of flexible material, typically polymeric material, together. Examples of tubular casing forming apparatus and an associated heat-sealing horn are described in U.S. Pat. Nos. 5,085,036 and 5,203,760, the contents of which are hereby incorporated by reference. However, as stated above, the apparatus may be a non-pumpable apparatus or may be configured to produce the tubular casings using additional and/or alternative joining or seaming means.

FIGS. 22A and 22B illustrate a conveyor/voider assembly 10v. The assembly 10v can include a linear actuator 387 that connects to member 388 that rotates shaft 389. The shaft 389 is attached to two pair of yokes and eccentrics 390 that cooperate to close and open opposing sides of the respective voiders 210 to void then separate responsive to actuation of the actuator driving the rotation of the shaft 389. Thus, in some embodiments, the packaging system can include a voider assembly 10v that is aligned with the conveyor 10. The voider assembly 10v can include a linear actuator 387 attached to shaft 389, and a first and second pair of axially spaced apart yokes 390 attached to the shaft 389. In operation, the linear actuator moves laterally inward and outward to rotate the shaft 389 to automatically force pairs of voider plates 210 to travel laterally toward each other, then away from each other. As shown, the voider plates 210 comprise a first downstream voider plate pair and a second upstream voider plate pair. The shaft 389 can be attached to the first voider plate pair that axially translates the first voider plate pair in concert with the telescoping conveyor 10. The shaft 389 can also include collar 209 adjacent the hub 211, which axially translates the telescoping conveyor 10.

The flowcharts and block diagrams of certain of the figures herein illustrate the architecture, functionality, and operation of possible implementations of embodiments according to the present invention. It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of mounting a conveyor belt to a telescoping conveyor residing downstream of a clipper, comprising:
providing a closed loop conveyor belt configured to mount to a telescoping conveyor mechanism to define a telescoping conveyor belt;
placing the conveyor belt on the telescoping conveyor mechanism;
pivoting a first idler roller held by a conveyor frame to an operative position;
moving an idler, held by the conveyor frame and residing under a conveying surface of the conveyor belt below the first idler roller inside the closed loop of the conveyor belt between forward and rearward idler rollers, upward and rearward into its respective operative position, wherein, in the operative position, the idler is mounted to the conveyor frame with a mounting bracket having a substantially horizontally extending slot and the idler does not move axially with the telescoping conveyor belt during operation; and
sliding the idler in a longitudinal direction in the slot in the mounting bracket holding the idler to the conveyor to adjust tension in the belt.

2. A method according to claim 1, wherein the mounting bracket has a mounting arm that is spaced apart from the slot and idler, the method further comprising placing the mounting arm through an aperture in a vertically extending housing sidewall to hold the mounting bracket and idler in operative position.

3. A method according to claim 1, wherein the mounting bracket has a mounting arm with opposing laterally spaced apart end portions with one end portion attached to a downwardly extending wall of the conveyor frame, and wherein the moving step comprises pivoting the arm from a load position with the slot extending downward to the operative position.

4. A method according to claim 1, wherein the pivoting the first idler roller to the operative fixed position is carried out before moving the idler upward and rearward into the idler's respective operative fixed position.

5. A method according to claim 1, further comprising attaching at least one pair of upwardly extending product guide sidewalls residing at least partially above the conveying surface of the conveyor belt, the at least one pair of product guide sidewalls being slidably attached to each other to axially translate substantially in concert with the axially telescoping conveyor between an extended and retracted position.

6. A method according to claim 1, wherein the conveyor includes a first downwardly extending planar sidewall that is releasably attached to at least one transversely extending bar, the method further comprising attaching the first sidewall to the at least one transversely extending bar and conveyor frame after the moving, pivoting and sliding steps.

7. A method according to claim 1, wherein the idler has first and second transversely spaced apart end portions, wherein, during operation, each is attached to a respective one of first and second transversely spaced apart downwardly extending housing sidewalls, the method further comprising, after moving the idler, attaching the second downwardly extending housing sidewall to a transversely extending support bar that has a tip portion that extends beyond the first and/or second housing sidewall when the first and/or second housing sidewall is attached thereto.

8. A method according to claim 1, further comprising, after the moving step, adding at least one pair of upwardly extending product guide sidewalls residing at least partially above the conveying surface of the conveyor belt, the at least one pair of product guide sidewalls being slidably attached to each other to axially translate substantially in concert with the axially telescoping conveyor between an extended and retracted position.

\* \* \* \* \*